(12) United States Patent
Kodera

(10) Patent No.: US 10,933,910 B2
(45) Date of Patent: Mar. 2, 2021

(54) STEERING CONTROLLER

(71) Applicant: JTEKT CORPORATION, Osaka (JP)

(72) Inventor: Takashi Kodera, Osaka (JP)

(73) Assignee: JTEKT CORPORATION, Osaka (JP)

( * ) Notice: Subject to any disclaimer, the term of this patent is extended or adjusted under 35 U.S.C. 154(b) by 129 days.

(21) Appl. No.: 16/256,493

(22) Filed: Jan. 24, 2019

(65) Prior Publication Data

US 2019/0233004 A1 Aug. 1, 2019

(30) Foreign Application Priority Data

Jan. 31, 2018 (JP) .............................. JP2018-015596

(51) Int. Cl.
*B62D 6/08* (2006.01)
*B62D 3/12* (2006.01)
*B62D 6/02* (2006.01)
*B62D 5/04* (2006.01)
*B62D 6/00* (2006.01)

(52) U.S. Cl.
CPC ............... *B62D 6/008* (2013.01); *B62D 3/12* (2013.01); *B62D 5/0463* (2013.01); *B62D 5/0466* (2013.01); *B62D 6/002* (2013.01)

(58) Field of Classification Search
CPC ...... B62D 3/12; B62D 5/0463; B62D 5/0466; B62D 6/002; B62D 6/008
See application file for complete search history.

(56) References Cited

U.S. PATENT DOCUMENTS

| 6,161,068 A * | 12/2000 | Kurishige ............ B62D 5/0463 180/400 |
| 2006/0086560 A1 | 4/2006 | Furusho et al. |
| 2008/0185213 A1* | 8/2008 | Mori ..................... B62D 5/006 180/402 |

(Continued)

FOREIGN PATENT DOCUMENTS

| EP | 2 851 266 A1 | 3/2015 |
| EP | 3 053 807 A2 | 8/2016 |

(Continued)

OTHER PUBLICATIONS

Jun. 6, 2019 extended Search Report issued in European Patent Application No. 19154214.1.

*Primary Examiner* — Tyler J Lee
(74) *Attorney, Agent, or Firm* — Oliff PLC

(57) ABSTRACT

A controller controls a steering motor in accordance with a pinion angle command value calculated in response to a steering state. The steering motor produces a driving force to a steering operation mechanism. The controller calculates a target pinion angle in accordance with the steering state and the pinion angle command value by performing feedback control such that an actual pinion angle corresponds to the target pinion angle. The controller includes a compensation control circuit which calculates compensation amounts reflected in the pinion angle command value so as to compensate for an inertia component, a viscosity component, and a spring component of the steering operation mechanism in accordance with the target pinion angle. The compensation control circuit adds the compensation amounts to the target pinion angle so as to calculate the final target pinion angle to be used for the calculation of the pinion angle command value.

6 Claims, 11 Drawing Sheets

(56) References Cited

U.S. PATENT DOCUMENTS

| | | | |
|---|---|---|---|
| 2009/0078494 | A1 | 3/2009 | Dornhege et al. |
| 2009/0224493 | A1* | 9/2009 | Buma ................ B60G 17/0162 280/5.511 |
| 2009/0250289 | A1* | 10/2009 | Kifuku ................ B62D 5/0487 180/446 |
| 2010/0168964 | A1* | 7/2010 | Higashi ................ B62D 5/0463 701/42 |
| 2012/0303218 | A1* | 11/2012 | Tamura .................... B62D 6/02 701/41 |
| 2017/0088174 | A1* | 3/2017 | Inoue .................. B60T 8/17557 |
| 2017/0183027 | A1 | 6/2017 | Kimura et al. |
| 2018/0257700 | A1* | 9/2018 | Ishikawa .............. B62D 15/021 |

FOREIGN PATENT DOCUMENTS

| | | |
|---|---|---|
| FR | 2 933 661 A3 | 1/2010 |
| JP | 2001-080536 A | 3/2001 |
| JP | 2014-151881 A | 8/2014 |

\* cited by examiner

STEERING CONTROLLER

INCORPORATION BY REFERENCE

The disclosure of Japanese Patent Application No. 2018-015596 filed on Jan. 31, 2018, including the specification, drawings and abstract, is incorporated herein by reference in its entirety.

BACKGROUND OF THE INVENTION

1. Field of the Invention

The invention relates to steering controllers.

2. Description of the Related Art

A "steer-by-wire" steering system is known in the related art. In the steer-by-wire steering system, a steering wheel is mechanically disconnected from steered wheel(s). Such a steering system includes a reaction motor and a steering motor. The reaction motor functions as a source of a steering reaction to be provided to a steering shaft. The steering motor functions as a source of a steering force to steer steered wheel(s). During travel of a vehicle, a controller for the steering system exercises not only reaction control to produce a steering reaction from the reaction motor but also steering control to steer the steered wheel(s) using the steering motor. Such a controller will hereinafter be referred to as a "steering controller".

Japanese Patent Application Publication No. 2014-151881 (JP 2014-151881 A), for example, discloses a steering controller that exercises steering control described below. The steering controller calculates a steady-state steering controlled variable and a differential steering controlled variable. The steady-state steering controlled variable is a controlled variable responsive to a steering angle. The differential steering controlled variable is a controlled variable responsive to a steering angular velocity. The steering controller adds up the steady-state steering controlled variable and the differential steering controlled variable and defines the resulting value as a target steered angle for steered wheel(s). The steering controller controls supply of power to a steering motor such that an actual steered angle corresponds to the target steered angle. The steering controller calculates the differential steering controlled variable in accordance with a vehicle travel mode selected from a plurality of modes including a normal mode and a sports mode. This enables the phase of the steered angle with respect to the steering angular velocity to be adaptable to the travel mode selected, making it possible to provide a target steering response.

Various vehicle-mounted controllers have recently been developed to enhance the performance of vehicles. In connection with this, studies are being conducted on steering controllers with the aim of further improving steering response (i.e., operations of steered wheels responsive to steering operations performed on steering wheels).

SUMMARY OF THE INVENTION

An object of the invention is to provide a steering controller that is able to effect proper steering of steered wheel(s).

An aspect of the invention provides a steering controller to control a motor in accordance with a command value calculated in response to a steering state. The motor is a source of a driving force to be provided to a steering operation mechanism configured to steer a steered wheel of a vehicle. The steering controller includes a compensation control circuit to calculate a compensation amount in response to the steering state so as to compensate for at least one of an inertia component, a viscosity component, and a spring component of the steering operation mechanism in accordance with a target rotation angle of a rotator. The compensation amount is to be reflected in the command value. The rotator is configured to rotate in conjunction with steering of the steered wheel.

The magnitude of influence of an inertia component, a viscosity component, and a spring component on steering of steered wheels may differ for each mechanism to steer the steered wheels. Differential steering control known in the related art may thus fail to reduce or eliminate the influence of an inertia component, a viscosity component, and a spring component on steering of steered wheels.

In this respect, the steering controller described above is configured such that the command value is reflective of the compensation amount for compensation of at least one of the inertia component, the viscosity component, and the spring component of the mechanism to steer the steered wheel. One example may involve compensating for only the inertia component when the inertia component significantly affects the steering of the steered wheel but the influence of the viscosity component and spring component is negligible. Another example may involve compensating for only the inertia component and the spring component when the inertia component and the spring component significantly affect the steering of the steered wheel but the influence of the viscosity component is negligible. Still another example may involve compensating for all of the inertia component, the viscosity component, and the spring component when all of the inertia component, the viscosity component, and the spring component affect the steering of the steered wheel. Thus, selectively compensating for the inertia component, the viscosity component, and the spring component in accordance with the characteristics of the mechanism to steer the steered wheel makes it possible to suitably reduce or eliminate any one, two, or all of the inertia component, the viscosity component, and the spring component that affect (s) the steering of the steered wheel. Accordingly, the steering controller controls the motor in accordance with the command value reflective of the compensation amount so as to effect proper steering of the steered wheel. This also provides proper steering response of the steered wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First Embodiment

A first embodiment of the invention involves using a steering controller in a steer-by-wire steering system. The steering controller is a controller 50. The steer-by-wire steering system is a steering system 10 for a vehicle.

Figure 1:
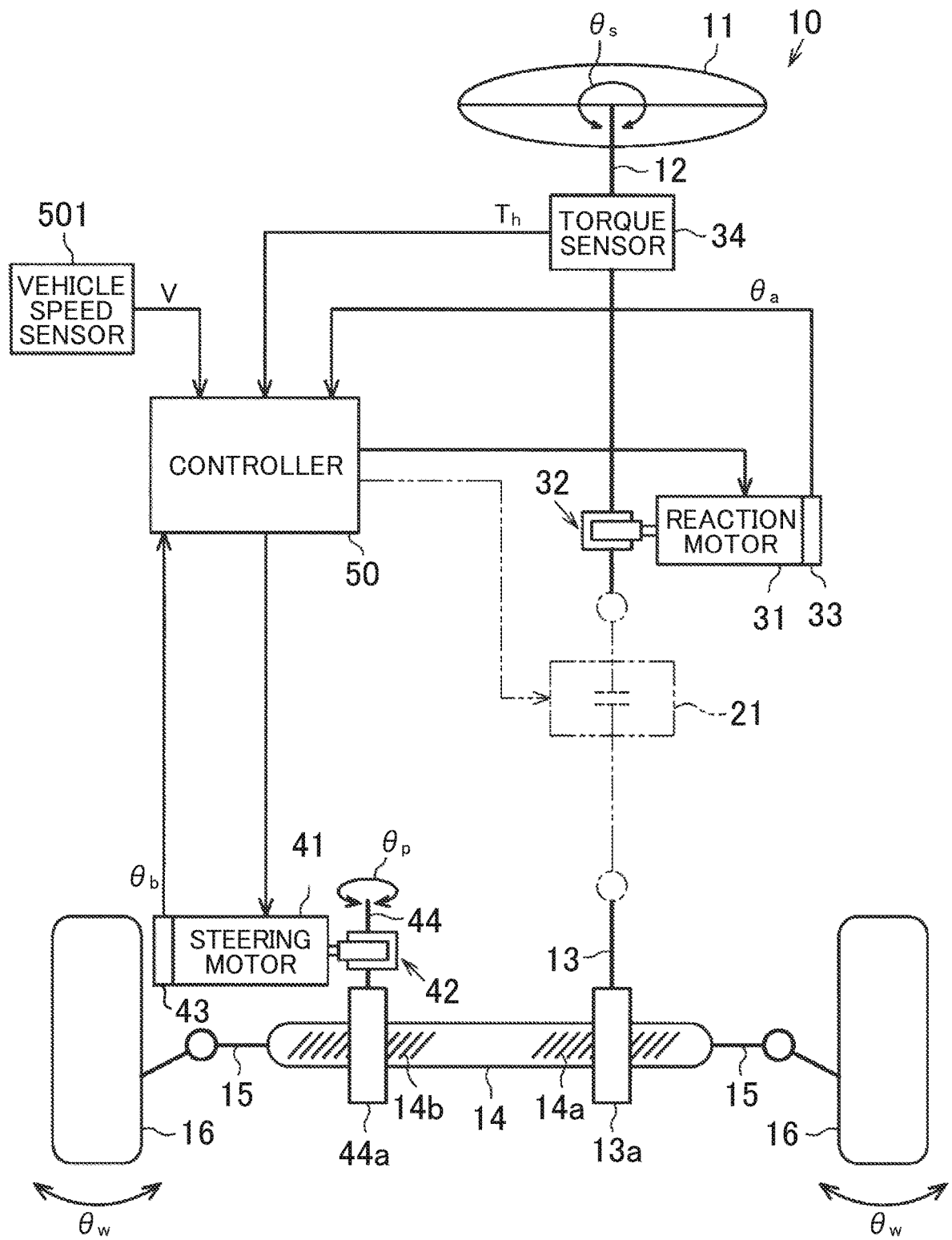
FIG. 1 is a schematic diagram illustrating a steer-by-wire steering system equipped with a steering controller according to a first embodiment of the invention.

As illustrated in FIG. 1, the vehicle steering system 10 includes a steering wheel 11 and a steering shaft 12 coupled to the steering wheel 11. The steering system 10 further includes a steering operation shaft 14 extending in a vehicle width direction. The vehicle width direction corresponds to the right-left direction in FIG. 1. The ends of the steering operation shaft 14 are each coupled to an associated one of right and left steered wheels 16 through an associated one of tie rods 15. A rectilinear motion of the steering operation shaft 14 changes a steered angle $\theta_w$ of each steered wheel 16.

The steering system 10 includes a reaction unit configured to produce a steering reaction. The reaction unit will be described below. The steering system 10 includes a reaction motor 31, a speed reducer 32, a rotation angle sensor 33, and a torque sensor 34 that are components of the reaction unit to produce a steering reaction. As used herein, the term "steering reaction" refers to a force (or torque) exerted on the steering wheel 11 in a direction opposite to a direction in which the steering wheel 11 is turned by a driver. Providing the steering reaction to the steering wheel 11 enables the driver to feel a moderate resistance.

The reaction motor 31 is a source of the steering reaction. Examples of the reaction motor 31 to be used include a brushless motor having three phases (e.g., U, V, and W phases). The reaction motor 31 (or to be more precise, the rotation shaft of the reaction motor 31) is coupled to the steering shaft 12 through the speed reducer 32. The speed reducer 32 is disposed on a portion of the steering shaft 12 located opposite to the steering wheel 11. A torque generated by the reaction motor 31 is provided to the steering shaft 12 in the form of the steering reaction.

The rotation angle sensor 33 is disposed on the reaction motor 31. The rotation angle sensor 33 detects a rotation angle $\theta_a$ of the reaction motor 31. The rotation angle $\theta_a$ of the reaction motor 31 is used for calculation of a steering angle $\theta_s$. The reaction motor 31 and the steering shaft 12 operate in conjunction with each other through the speed reducer 32. Thus, the rotation angle $\theta_a$ of the reaction motor 31 correlates with a rotation angle of the steering shaft 12 and also correlates with the steering angle $\theta_s$ that is a rotation angle of the steering wheel 11. This makes it possible to determine the steering angle $\theta_s$ in accordance with the rotation angle $\theta_a$ of the reaction motor 31.

The torque sensor 34 detects a steering torque $T_h$ applied to the steering shaft 12 as a result of a turning operation performed on the steering wheel 11. The torque sensor 34 is disposed on a portion of the steering shaft 12 located closer to the steering wheel 11 relative to the speed reducer 32.

The steering system 10 includes a steering unit configured to produce a steering force. The steering unit will be described below. The steering system 10 includes a steering motor 41, a speed reducer 42, and a rotation angle sensor 43 that are components of the steering unit to produce a steering force that is power to steer the steered wheels 16.

The steering motor 41 is a source of the steering force. Examples of the steering motor 41 to be used include a three-phase brushless motor. The steering motor 41 (or to be more precise, the rotation shaft of the steering motor 41) is coupled to a pinion shaft 44 through the speed reducer 42. The pinion shaft 44 includes pinion teeth 44a. The steering operation shaft 14 includes rack teeth 14b. The pinion teeth 44a of the pinion shaft 44 are in mesh with the rack teeth 14b of the steering operation shaft 14. A torque generated by the steering motor 41 is provided to the steering operation shaft 14 through the pinion shaft 44. The torque generated by the steering motor 41 is provided in the form of the steering force. The steering operation shaft 14 moves in the vehicle width direction (i.e., the right-left direction in FIG. 1) in accordance with rotation of the steering motor 41.

The rotation angle sensor 43 is disposed on the steering motor 41. The rotation angle sensor 43 detects a rotation angle $\theta_b$ of the steering motor 41. The steering system 10 includes a pinion shaft 13. The pinion shaft 13 is disposed to intersect with the steering operation shaft 14. The pinion shaft 13 includes pinion teeth 13a. The steering operation shaft 14 includes rack teeth 14a. The pinion teeth 13a of the pinion shaft 13 are in mesh with the rack teeth 14a of the steering operation shaft 14. The pinion shaft 13 is provided in order to support the steering operation shaft 14 inside a housing (not illustrated) together with the pinion shaft 44. Specifically, the pinion shaft 13 functions as a support that supports the steering operation shaft 14 such that the steering operation shaft 14 is movable along its axis and pressed against the pinion shaft 13 and the pinion shaft 44. This supports the steering operation shaft 14 inside the housing. Alternatively, the support that supports the steering operation shaft 14 inside the housing may be a component other than the pinion shaft 13. The pinion shaft 44 and the steering operation shaft 14 are components of a steering operation mechanism to steer the steered wheels 16.

The steering system 10 includes the controller 50. The controller 50 controls the reaction motor 31 and the steering motor 41 in accordance with detection results obtained by various sensors, such as the rotation angle sensor 33, the torque sensor 34, the rotation angle sensor 43, and a vehicle speed sensor 501. The vehicle speed sensor 501 is disposed on the vehicle. The vehicle speed sensor 501 detects a vehicle speed V that is a travel speed of the vehicle.

The controller 50 exercises reaction control to produce a steering reaction responsive to the steering torque $T_h$ by controlling driving of the reaction motor 31. The controller 50 calculates a target steering reaction in accordance with the steering torque $T_h$ and the vehicle speed V. The controller 50 calculates a target steering angle of the steering wheel 11 in accordance with the target steering reaction calculated, the steering torque $T_h$, and the vehicle speed V. The controller 50 calculates a steering angle correction amount by performing feedback control for the steering angle $\theta_s$ such that the actual steering angle $\theta_s$ approaches or corresponds to the target steering angle. The controller 50 adds the steering angle correction amount to the target steering reaction so as to calculate a steering reaction command value. The controller 50 supplies a current to the reaction motor 31. The current is necessary to produce a steering reaction responsive to the steering reaction command value.

The controller 50 exercises steering control to steer the steered wheels 16 in accordance with a steering state by controlling driving of the steering motor 41. The controller 50 calculates a pinion angle $\theta_p$ in accordance with the rotation angle $\theta_b$ of the steering motor 41 detected by the rotation angle sensor 43. The pinion angle $\theta_p$ is an actual rotation angle of the pinion shaft 44. The pinion angle $\theta_p$ is a value reflective of the steered angle $\theta_w$ of the steered wheels 16. The controller 50 calculates a target pinion angle in accordance with the target steering angle. The controller 50 determines a difference between the target pinion angle and the actual pinion angle $\theta_p$. The controller 50 controls supply of power to the steering motor 41 so as to eliminate the difference between the target pinion angle and the actual pinion angle $\theta_p$.

Figure 2:
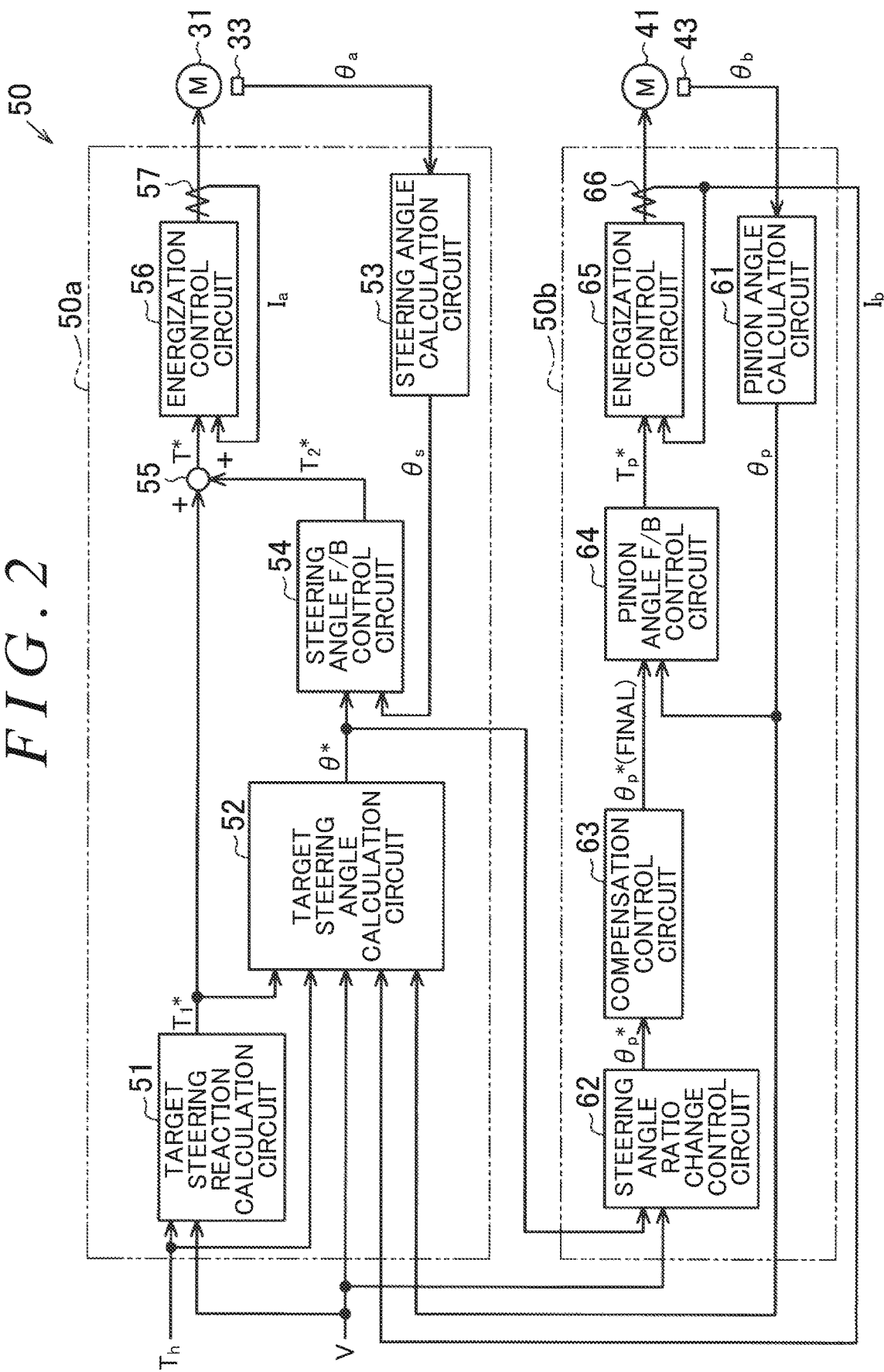
FIG. 2 is a control block diagram of a controller according to the first embodiment.

The controller 50 will be described in more detail below. As illustrated in FIG. 2, the controller 50 includes a reaction control circuit 50a and a steering control circuit 50b. The reaction control circuit 50a exercises reaction control. The steering control circuit 50b exercises steering control.

The reaction control circuit 50a includes a target steering reaction calculation circuit 51, a target steering angle calculation circuit 52, a steering angle calculation circuit 53, a steering angle feedback control circuit 54, an adder 55, and an energization control circuit 56.

The target steering reaction calculation circuit 51 calculates a target steering reaction $T_1^*$ in accordance with the steering torque $T_h$ and the vehicle speed V. The target steering angle calculation circuit 52 calculates a target steering angle $\theta^*$ of the steering wheel 11 in accordance with the target steering reaction $T_1^*$, the steering torque $T_h$, and the vehicle speed V. When the sum of the target steering reaction $T_1^*$ and the steering torque $T_h$ is an input torque, the target steering angle calculation circuit 52 includes an ideal model that defines an ideal steering angle in accordance with the input torque. Providing the ideal model may involve conducting, in advance, experiment(s) on a steering system including a power transmission path through which a steering wheel is mechanically coupled to steered wheels, so as to model a steering angle responsive to an ideal steered angle determined in accordance with the input torque. The target steering angle calculation circuit 52 adds up the target steering reaction $T_1^*$ and the steering torque $T_h$ so as to determine the input torque. The target steering angle calculation circuit 52 calculates, from the input torque, the target steering angle $\theta^*$ in accordance with the ideal model.

The steering angle calculation circuit 53 calculates the actual steering angle $\theta_s$ of the steering wheel 11 in accordance with the rotation angle $\theta_a$ of the reaction motor 31 detected by the rotation angle sensor 33. The steering angle feedback control circuit 54 calculates a steering angle correction amount $T_2^*$ by performing feedback control for the steering angle $\theta_s$ such that the actual steering angle $\theta_s$ approaches or corresponds to the target steering angle $\theta^*$. The adder 55 adds the steering angle correction amount $T_2^*$ to the target steering reaction $T_1^*$ so as to calculate a steering reaction command value $T^*$.

The energization control circuit 56 supplies power to the reaction motor 31. The power is responsive to the steering reaction command value $T^*$. Specifically, the energization control circuit 56 calculates a current command value for the reaction motor 31 in accordance with the steering reaction command value $T^*$. The controller 50 includes a current sensor 57 disposed on a power supply path connected to the reaction motor 31. Using the current sensor 57, the energization control circuit 56 detects a current value $I_a$ of an actual current flowing through the power supply path. As used herein, the term "current value $I_a$" refers to the value of an actual current supplied to the reaction motor 31. The energization control circuit 56 determines a difference between the current command value and the actual current value $I_a$. The energization control circuit 56 controls supply of power to the reaction motor 31 (or performs feedback control for the current value $I_a$) so as to eliminate the difference between the current command value and the actual current value $I_a$. This causes the reaction motor 31 to produce a torque responsive to the steering reaction command value $T^*$. The driver is thus able to feel a moderate resistance responsive to a road surface reaction.

As illustrated in FIG. 2, the steering control circuit 50b includes a pinion angle calculation circuit 61, a steering angle ratio change control circuit 62, a compensation control circuit 63, a pinion angle feedback control circuit 64, and an energization control circuit 65.

The pinion angle calculation circuit 61 calculates a pinion angle $\theta_p$ in accordance with the rotation angle $\theta_b$ of the steering motor 41 detected by the rotation angle sensor 43. The pinion angle $\theta_p$ is an actual rotation angle of the pinion shaft 44. As previously mentioned, the steering motor 41 and the pinion shaft 44 operate in conjunction with each other through the speed reducer 42. The rotation angle $\theta_b$ of the steering motor 41 thus has a correlation with the pinion angle $\theta_p$ of the pinion shaft 44. Using this correlation makes it possible to determine the pinion angle $\theta_p$ from the rotation angle $\theta_b$ of the steering motor 41. As also previously described, the pinion shaft 44 is in mesh with the steering operation shaft 14. The pinion angle $\theta_p$ thus has a correlation with a distance by which the steering operation shaft 14 moves. In other words, the pinion angle $\theta_p$ is a value reflective of the steered angle $\theta_w$ of the steered wheels 16.

In accordance with a vehicle travel state (e.g., the vehicle speed V), the steering angle ratio change control circuit 62 defines a steering angle ratio that is the ratio of the steered angle $\theta_w$ to the steering angle $\theta_s$. The steering angle ratio change control circuit 62 calculates a target pinion angle in accordance with the steering angle ratio defined. The steering angle ratio change control circuit 62 calculates a target pinion angle $\theta_p^*$ such that the lower the vehicle speed V, the greater the steered angle $\theta_w$ relative to the steering angle $\theta_s$, and the higher the vehicle speed V, the smaller the steered angle $\theta_w$ relative to the steering angle $\theta_s$. In order to define a steering angle ratio responsive to a vehicle travel state, the steering angle ratio change control circuit 62 calculates a correction angle for the target steering angle $\theta^*$. The steering angle ratio change control circuit 62 adds the correction angle to the target steering angle $\theta^*$ so as to calculate the target pinion angle $\theta_p^*$ responsive to the steering angle ratio.

The compensation control circuit 63 exercises control to enhance the response of the steered wheels 16 to an operation performed on the steering wheel 11, for example. The response of the steered wheels 16 to an operation performed on the steering wheel 11 will hereinafter be referred to as "steering responsiveness". In accordance with the target pinion angle $\theta_p^*$ calculated by the steering angle ratio change control circuit 62, the compensation control circuit 63 calculates a compensation amount for compensation of an inertia component, a viscosity component, and a spring component of the steering operation mechanism of the steering system 10. The compensation control circuit 63 adds the compensation amount to the target pinion angle $\theta_p^*$ calculated by the steering angle ratio change control circuit 62. The compensation control circuit 63 thus calculates the final target pinion angle $\theta_p^*$. The compensation control circuit 63 will be described in more detail below.

The pinion angle feedback control circuit 64 calculates a pinion angle command value $T_p^*$ by performing feedback control (e.g., PID control) for the pinion angle $\theta_p$ such that the actual pinion angle $\theta_p$ approaches or corresponds to the final target pinion angle $\theta_p^*$ calculated by the compensation control circuit 63.

The energization control circuit 65 supplies power to the steering motor 41. The power is responsive to the pinion angle command value $T_p^*$. Specifically, the energization control circuit 65 calculates a current command value for the steering motor 41 in accordance with the pinion angle command value $T_p^*$. The controller 50 includes a current sensor 66 disposed on a power supply path connected to the steering motor 41. Using the current sensor 66, the energization control circuit 65 detects a current value $I_b$ of an actual current flowing through the power supply path. As used herein, the term "current value $I_b$" refers to the value of an actual current supplied to the steering motor 41. The energization control circuit 65 determines a difference between the current command value and the actual current value $I_b$. The energization control circuit 65 controls supply of power to the steering motor 41 (or performs feedback control for the current value $I_b$) so as to eliminate the difference between the current command value and the actual current value $I_b$. This causes the steering motor 41 to rotate by an angle responsive to the pinion angle command value $T_p^*$.

The target steering angle calculation circuit 52 will be described in detail below. As previously described, the target steering angle calculation circuit 52 calculates, in accordance with the ideal model, the target steering angle $\theta^*$ from an input torque that is the sum of the target steering reaction $T_1^*$ and the steering torque $T_h$. The ideal model uses an input torque $T_{in}^*$ that is a torque to be applied to the steering shaft 12. The input torque $T_{in}^*$ is represented by Equation (A):

$$T_{in}^* = J\theta^{*\prime\prime} + C\theta^{*\prime} + K\theta^* \quad (A)$$

In Equation (A), J denotes the inertia moment of the steering wheel 11 and the steering shaft 12, C denotes a viscosity coefficient (or friction coefficient) for, for example, the friction of the steering operation shaft 14 against the housing, and K denotes a spring modulus determined when the steering wheel 11 and the steering shaft 12 are each regarded as a spring.

As is evident from Equation (A), calculation of the input torque $T_{in}^*$ involves adding up the product of a second-order time differential value $\theta^{*\prime\prime}$ of the target steering angle $\theta^*$ and the inertia moment J, the product of a first-order time differential value $\theta^{*\prime}$ of the target steering angle $\theta^*$ and the viscosity coefficient C, and the product of the target steering angle $\theta^*$ and the spring modulus K. The target steering angle calculation circuit 52 calculates the target steering angle $\theta^*$ in accordance with the ideal model based on Equation (A).

Figure 3:
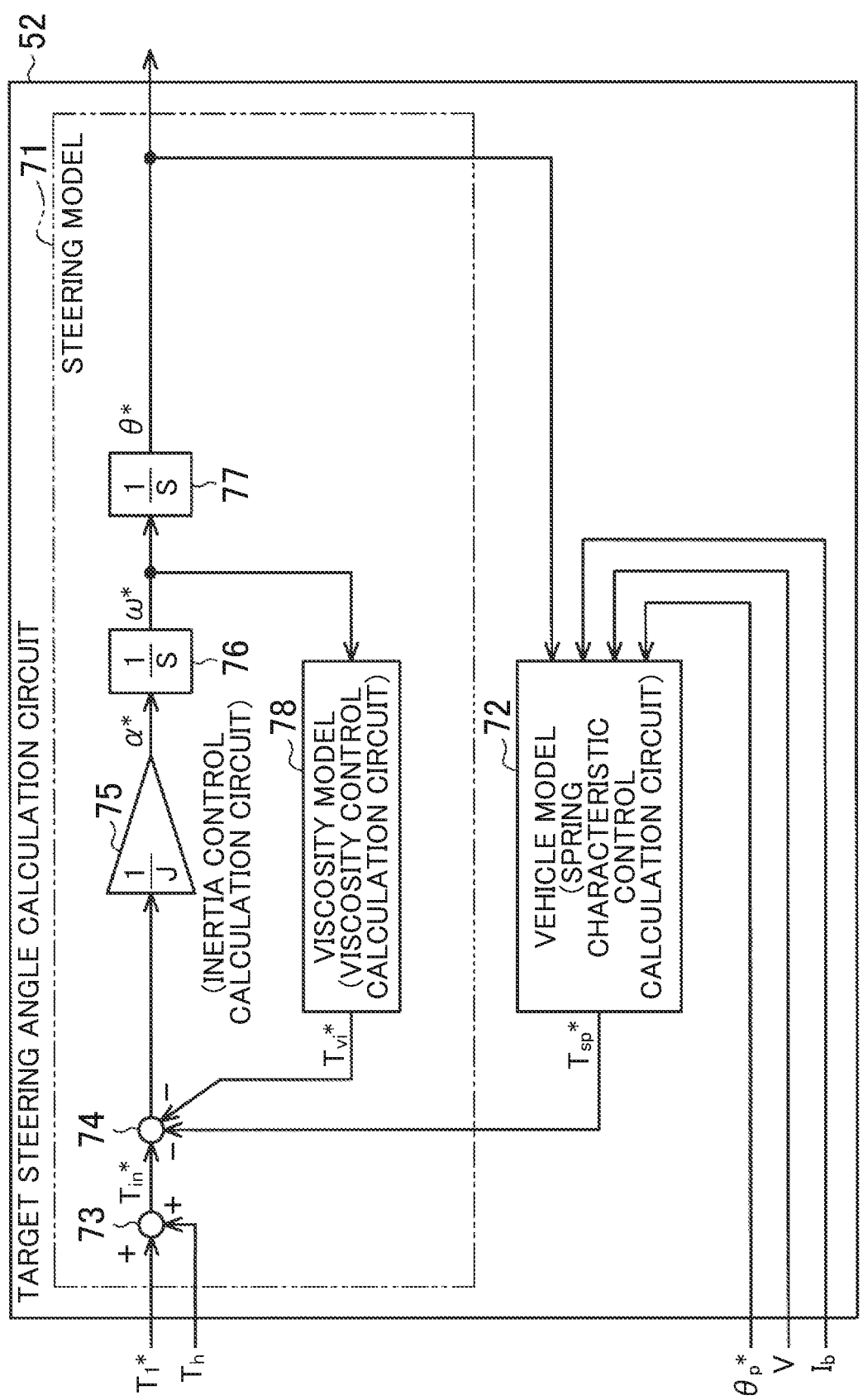
FIG. 3 is a control block diagram of a target steering angle calculation circuit according to the first embodiment.

As illustrated in FIG. 3, the ideal model based on Equation (A) is divided into a steering model 71 and a vehicle model 72. The steering model 71 is tuned in accordance with the characteristics of components of the steering system 10, such as the steering shaft 12 and the reaction motor 31. The steering model 71 includes an adder 73, a subtracter 74, an inertia model 75, a first integrator 76, a second integrator 77, and a viscosity model 78.

The adder 73 adds up the target steering reaction $T_1^*$ and the steering torque $T_h$ so as to calculate the input torque $T_{in}^*$. The subtracter 74 subtracts a viscosity component $T_{vi}^*$ and a spring component $T_{sp}^*$ (which will be described below) from the input torque $T_{in}^*$ calculated by the adder 73. The subtracter 74 thus calculates the final input torque $T_{in}^*$.

The inertia model 75 functions as an inertia control calculation circuit associated with an inertia term of Equation (A). The inertia model 75 multiplies the final input torque $T_{in}^*$, calculated by the subtracter 74, by the inverse of the inertia moment J so as to calculate a steering angle acceleration $\alpha^*$.

The first integrator 76 integrates the steering angle acceleration $\alpha^*$ calculated by the inertia model 75. The first integrator 76 thus calculates a steering angle velocity $\omega^*$. The second integrator 77 integrates the steering angle velocity $\omega^*$ calculated by the first integrator 76. The second integrator 77 thus calculates the target steering angle $\theta^*$. The target steering angle $\theta^*$ is an ideal rotation angle of the steering wheel 11 (or the steering shaft 12) that is based on the steering model 71.

The viscosity model 78 functions as a viscosity control calculation circuit associated with the viscosity term of Equation (A). The viscosity model 78 multiplies the steering angle velocity $\omega^*$, calculated by the first integrator 76, by the viscosity coefficient C. The viscosity model 78 thus calculates the viscosity component $T_{vi}^*$ to be subtracted from the input torque $T_{in}^*$.

The vehicle model 72 is tuned in accordance with the characteristics of the vehicle equipped with the steering system 10. The characteristics of the vehicle that influence steering characteristics are determined in accordance with, for example, specifications of suspension and wheel alignment and the gripping force (or frictional force) of the steered wheels 16. The vehicle model 72 functions as a spring characteristic control calculation circuit associated with the spring term of Equation (A). The vehicle model 72 multiplies the target steering angle $\theta^*$, calculated by the second integrator 77, by the spring modulus K. The vehicle model 72 thus calculates the spring component $T_{sp}^*$ (torque) to be subtracted from the input torque $T_{in}^*$.

The target steering angle calculation circuit 52 thus configured adjusts the inertia moment J and the viscosity coefficient C of the steering model 71 and the spring modulus K of the vehicle model 72. This makes it possible to directly tune the relationship between the input torque $T_{in}^*$ and the target steering angle $\theta^*$, thus providing desired steering characteristics.

The present embodiment involves calculating the target pinion angle $\theta_p^*$ using the target steering angle $\theta^*$ calculated from the input torque $T_{in}^*$ in accordance with the steering model 71 and the vehicle model 72. The present embodiment then involves performing feedback control such that the actual pinion angle $\theta_p$ corresponds to the target pinion angle $\theta_p^*$. As already mentioned, the pinion angle $\theta_p$ has a correlation with the steered angle $\theta_w$ of the steered wheels 16. The steering of the steered wheels 16 responsive to the input torque $T_{in}^*$ is thus determined by the steering model 71 and the vehicle model 72. In other words, a vehicle steering response is determined by the steering model 71 and the vehicle model 72. Consequently, adjusting the steering model 71 and the vehicle model 72 makes it possible to provide a desired steering response.

Unfortunately, a steering reaction that is a force (or torque) exerted in a direction opposite to a direction in which the steering wheel 11 is turned by the driver is merely responsive to the target steering angle θ*. As used herein, the term "steering reaction" refers to a resistance felt by the driver through the steering wheel 11. In other words, the steering reaction does not change in accordance with a vehicle behavior or a road surface condition (such as road surface slippage). The driver thus finds it difficult to understand a vehicle behavior or a road surface condition through the steering reaction. To solve such a problem, the vehicle model 72 according to the present embodiment is configured as described below.

Figure 4:
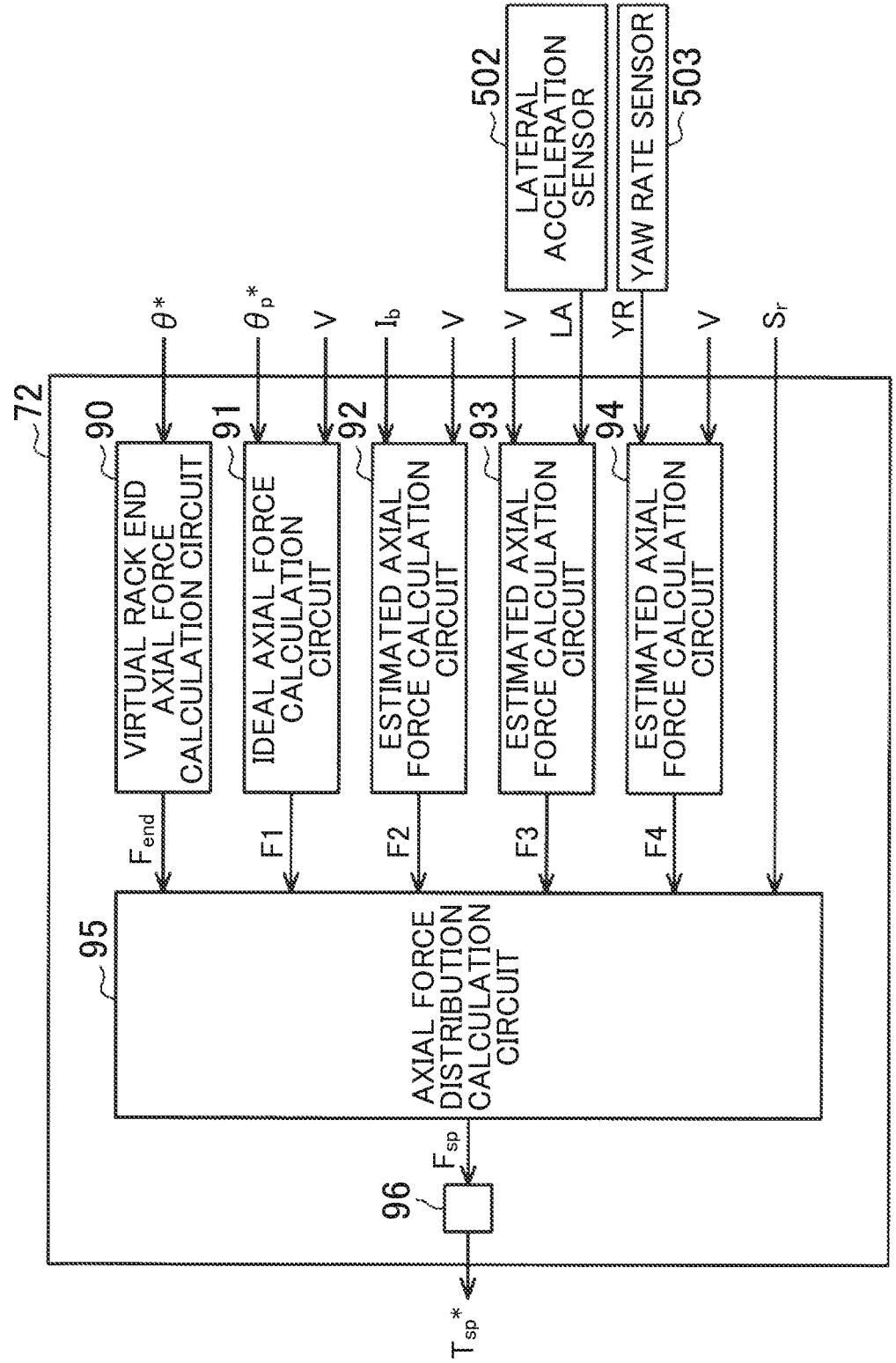
FIG. 4 is a control block diagram of a vehicle model according to the first embodiment.

As illustrated in FIG. 4, the vehicle model 72 includes a virtual rack end axial force calculation circuit 90, an ideal axial force calculation circuit 91, an estimated axial force calculation circuit 92, an estimated axial force calculation circuit 93, an estimated axial force calculation circuit 94, an axial force distribution calculation circuit 95, and a conversion circuit 96.

In accordance with the target steering angle θ*, the virtual rack end axial force calculation circuit 90 calculates a virtual rack end axial force $F_{end}$ to limit the range of operation of the steering wheel 11 in a virtual sense. The virtual rack end axial force calculation circuit 90 calculates the virtual rack end axial force $F_{end}$ from the viewpoint of sharply increasing a torque to be produced by the reaction motor 31. The torque produced by the reaction motor 31 is exerted in a direction opposite to a direction in which the steering wheel 11 is turned by the driver. This torque will be referred to as a "steering reaction torque". The virtual rack end axial force calculation circuit 90 calculates the virtual rack end axial force $F_{end}$ using a virtual rack end map stored in a memory (not illustrated) of the controller 50. The virtual rack end axial force $F_{end}$ is produced when or after the target steering angle θ* has reached an angle threshold value. The virtual rack end axial force $F_{end}$ sharply increases in response to an increase in the target steering angle θ*.

The ideal axial force calculation circuit 91 calculates an ideal axial force F1 in accordance with the target pinion angle $θ_p$*. The ideal axial force F1 is an ideal value of an axial force to be exerted on the steering operation shaft 14 through the steered wheels 16. The ideal axial force calculation circuit 91 calculates the ideal axial force F1 using an ideal axial force map stored in a memory (not illustrated) of the controller 50. The absolute value of the ideal axial force F1 to be calculated increases as the absolute value of the target pinion angle $θ_p$* increases (or the absolute value of a target steered angle that is the product of the target pinion angle $θ_p$* and a predetermined conversion factor increases). The absolute value of the ideal axial force F1 to be calculated may increase as the vehicle speed V decreases.

The estimated axial force calculation circuit 92 calculates an estimated axial force F2 (or road surface reaction) in accordance with the current value $I_b$ of the steering motor 41. The estimated axial force F2 is exerted on the steering operation shaft 14. The current value $I_b$ of the steering motor 41 changes owing to a difference between the target pinion angle $θ_p$* and the actual pinion angle $θ_p$ resulting from the action of a disturbance responsive to a road surface condition (such as a road surface frictional resistance) on the steered wheels 16. In other words, the current value $I_b$ of the steering motor 41 is reflective of an actual road surface reaction exerted on the steered wheels 16. This makes it possible to calculate an axial force reflective of the influence of a road surface condition in accordance with the current value $I_b$ of the steering motor 41. The estimated axial force calculation circuit 92 determines the estimated axial force F2 by multiplying the current value $I_b$ of the steering motor 41 by a gain that is a factor responsive to the vehicle speed V.

The estimated axial force calculation circuit 93 calculates an estimated axial force F3 in accordance with a lateral acceleration LA detected by a lateral acceleration sensor 502 disposed on the vehicle. The estimated axial force F3 is exerted on the steering operation shaft 14. The estimated axial force calculation circuit 93 determines the estimated axial force F3 by multiplying the lateral acceleration LA by a gain that is a factor responsive to the vehicle speed V. The lateral acceleration LA is reflective of a road surface condition, such as a road surface frictional resistance. The estimated axial force F3 calculated in accordance with the lateral acceleration LA is thus reflective of an actual road surface condition.

The estimated axial force calculation circuit 94 calculates an estimated axial force F4 in accordance with a yaw rate YR detected by a yaw rate sensor 503 disposed on the vehicle. The estimated axial force F4 is exerted on the steering operation shaft 14. The estimated axial force calculation circuit 94 determines the estimated axial force F4 by multiplying a yaw rate differential value by a vehicle speed gain. The yaw rate differential value is calculated by differentiating the yaw rate YR. The vehicle speed gain is a factor responsive to the vehicle speed V. The higher the vehicle speed V, the greater the vehicle speed gain. The yaw rate YR is reflective of a road surface condition, such as a road surface frictional resistance. The estimated axial force F4 calculated in accordance with the yaw rate YR is thus reflective of an actual road surface condition.

The axial force distribution calculation circuit 95 multiples each of the virtual rack end axial force $F_{end}$, the ideal axial force F1, the estimated axial force F2, the estimated axial force F3, and the estimated axial force F4 by a distribution ratio (or gain) defined for each of these forces. The axial force distribution calculation circuit 95 adds up the resulting products so as to calculate a final axial force $F_{sp}$. The final axial force $F_{sp}$ is used for the calculation of the spring component $T_{sp}$* to be subtracted from the input torque $T_{in}$*. The distribution ratios are defined in accordance with various state quantities each reflective of a vehicle behavior, a road surface condition or a steering state.

In accordance with the final axial force $F_{sp}$ calculated by the axial force distribution calculation circuit 95, the conversion circuit 96 calculates (or converts) the spring component $T_{sp}$* to be subtracted from the input torque $T_{in}$*. The spring component $T_{sp}$* based on the final axial force $F_{sp}$ is thus reflected in the input torque $T_{in}$*. This makes it possible to provide a steering reaction responsive to a vehicle behavior or a road surface condition to the steering wheel 11.

Figure 5:
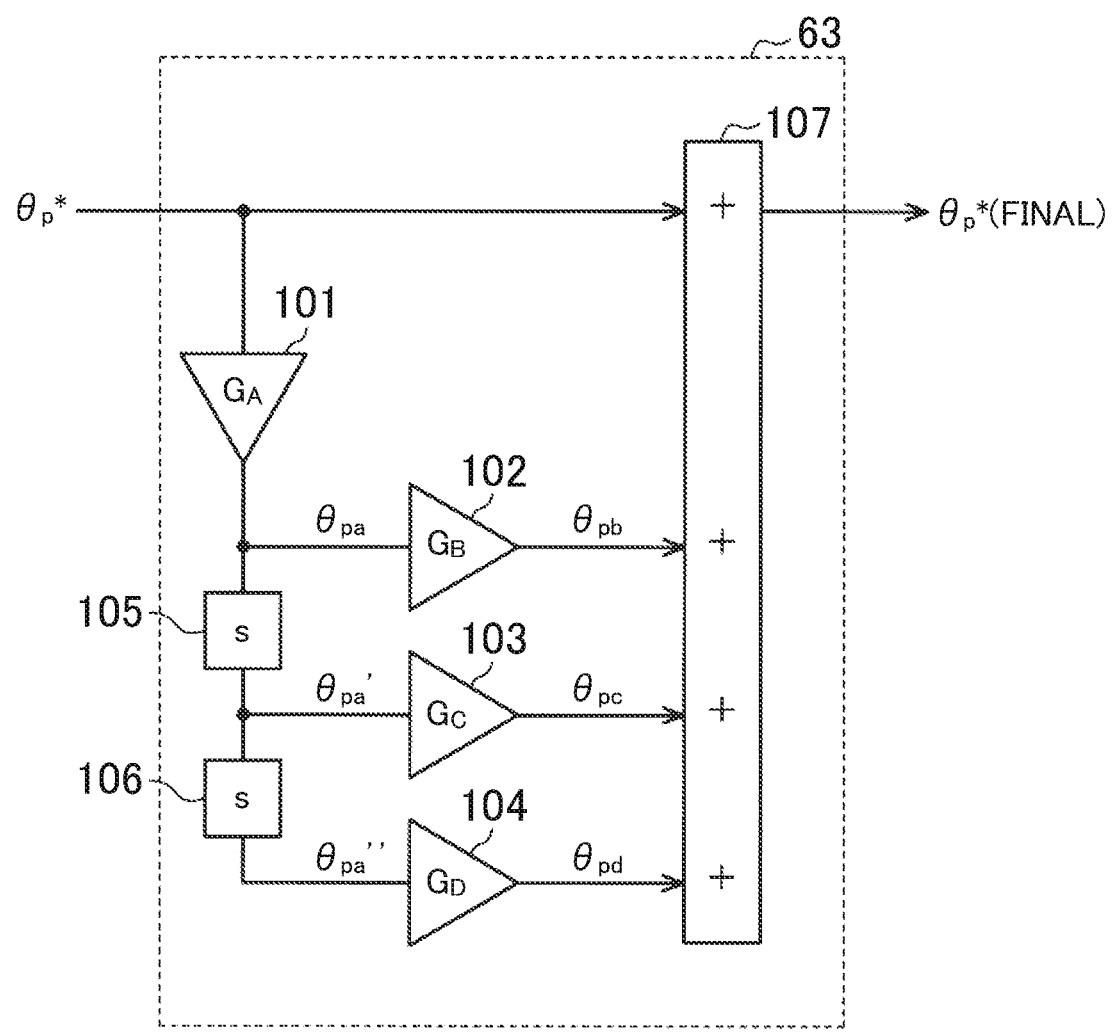
FIG. 5 is a control block diagram of a compensation control circuit according to the first embodiment.

The compensation control circuit 63 will be described in detail. As illustrated in FIG. 5, the compensation control circuit 63 includes four calculation circuits 101, 102, 103, 104, two differentiators 105, 106, and an adder 107.

The calculation circuit 101 multiplies the target pinion angle $θ_p$*, calculated by the steering angle ratio change control circuit 62, by a gain $G_A$ so as to calculate a value $θ_{pa}$. The gain $G_A$ is determined in accordance with, for example, Equation (B):

$$G_A = 1/K_G \quad (B)$$

In Equation (B), $K_G$ denotes a mount rigidity of the steering operation mechanism. As used herein, the term "mount rigidity of the steering operation mechanism" refers to rigidity of the steering operation mechanism supported on the body of the vehicle. The differentiator 105 differentiates the value $\theta_{pa}$ calculated by the calculation circuit 101. The differentiator 105 thus calculates a value $\theta_{pa}'$. The differentiator 106 differentiates the value $\theta_{pa}'$ calculated by the differentiator 105. The differentiator 106 thus calculates a value $\theta_{pa}''$.

The calculation circuit 102 multiplies the value $\theta_{pa}$, calculated by the calculation circuit 101, by a gain $G_B$. The calculation circuit 102 thus calculates a spring compensation amount (or rigidity compensation amount) $\theta_{pb}$ for compensation of the spring component (or rigidity component) of the steering operation mechanism. The gain $G_B$ is determined in accordance with, for example, Equation (C):

$$G_B = 2 \cdot C_{\mathit{ff}} \cdot \xi \quad (C)$$

In Equation (C), $C_{\mathit{ff}}$ denotes a cornering force $C_{\mathit{ff}}$, and $\xi$ denotes a trail.

The calculation circuit 103 multiplies the value $\theta_{pa}'$, calculated by the differentiator 105, by a gain $G_C$. The calculation circuit 103 thus calculates a viscosity compensation amount $\theta_{pc}$ for compensation of the viscosity component of the steering operation mechanism. The gain $G_C$ is defined in accordance with a viscosity $C_w$ of the steering operation mechanism as indicated by Equation (D):

$$G_C = C_w \quad (D)$$

The calculation circuit 104 multiplies the value $\theta_{pa}''$, calculated by the differentiator 106, by a gain $G_D$. The calculation circuit 104 thus calculates an inertia compensation amount $\theta_{pd}$ for compensation of the inertia component of the steering operation mechanism. The gain $G_D$ is defined in accordance with an inertia $J_w$ of the steering operation mechanism as indicated by Equation (E):

$$G_D = J_w \quad (E)$$

The spring compensation amount $\theta_{pb}$, the viscosity compensation amount $\theta_{pc}$, and the inertia compensation amount $\theta_{pd}$ are correction angles for the target pinion angle $\theta_p^*$.

The adder 107 adds the spring compensation amount $\theta_{pb}$, the viscosity compensation amount $\theta_{pc}$, and the inertia compensation amount $\theta_{pd}$ to the target pinion angle $\theta_p^*$ calculated by the steering angle ratio change control circuit 62. The adder 107 thus calculates the final target pinion angle $\theta_p^*$.

The pinion angle feedback control circuit 64 calculates the pinion angle command value $T_p^*$ by performing feedback control for the pinion angle $\theta_p$ in accordance with the final target pinion angle $\theta_p^*$. This compensates for the spring component, the viscosity component, and the inertia component of the steering operation mechanism of the steering system 10. The spring component results from, for example, the mount rigidity and cornering force of the steering operation mechanism. The viscosity component results from, for example, the viscosity of the steering operation mechanism (including the pinion shaft 44 and the steering operation shaft 14) and the viscosity of a kingpin. The inertia component results from, for example, the inertia of the steering operation mechanism and the inertia of the steered wheels 16.

Exemplary changes in the target pinion angle $\theta_p^*$, the actual steered angle $\theta_w$, and a steered angle $\theta_{wex}$ with respect to time will be described below. The target pinion angle $\theta_p^*$ may also be referred to as a "target steered angle". The steered angle $\theta_{wex}$ is a comparative example. The steered angle $\theta_w$ is obtainable by multiplying the pinion angle $\theta_p$ by a predetermined conversion factor. The target steered angle is obtainable by multiplying the target pinion angle by a predetermined conversion factor. The steered angle $\theta_{wex}$ (comparative example) is a steered angle obtained when the compensation control circuit 63 is not included in the controller 50.

Figure 6:
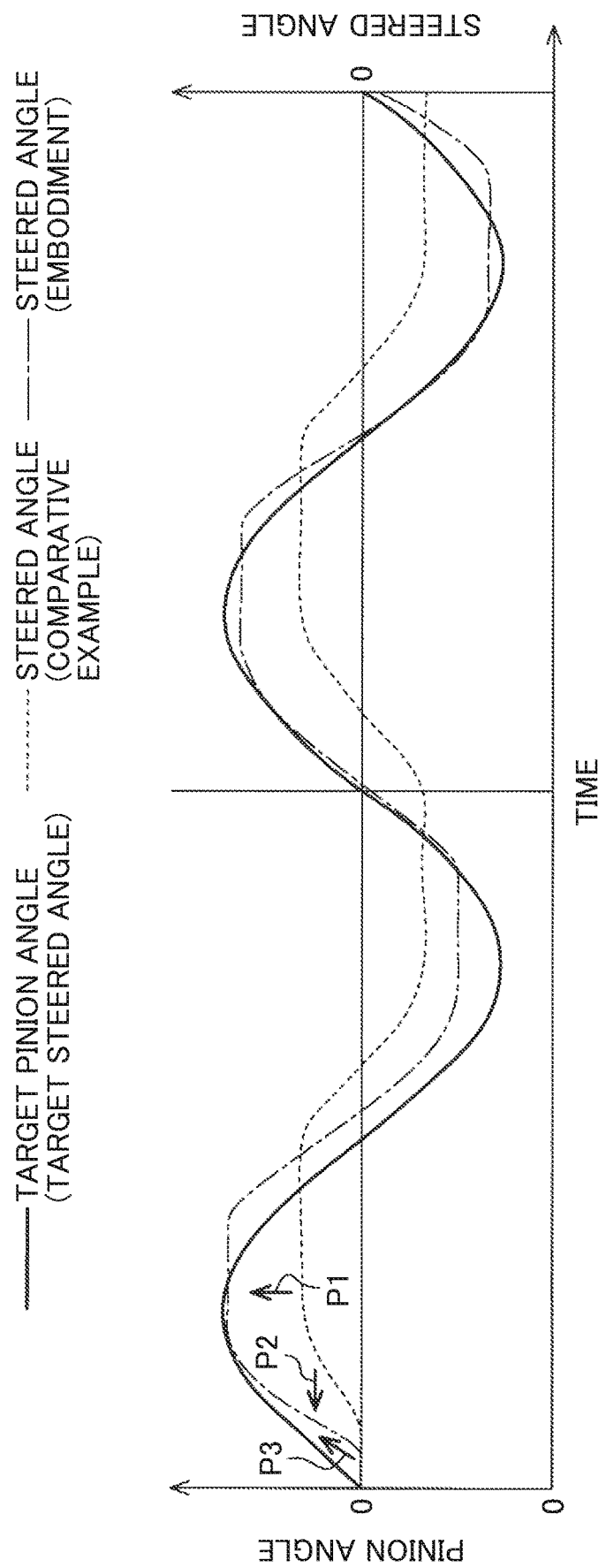
FIG. 6 is a graph illustrating changes in target steered angle and actual steered angle with respect to time in the first embodiment.

As indicated by the arrow P1 in the graph of FIG. 6, compensating for the spring component of the steering operation mechanism results in a situation where the actual steered angle $\theta_w$ is closer to the target pinion angle $\theta_p^*$ (target steered angle) than the steered angle $\theta_{wex}$ (comparative example). This is based on the fact that the spring component of the steering operation mechanism is exerted so as to further reduce the axial force of the steering operation shaft 14 with respect to the pinion angle $\theta_p$.

As indicated by the arrow P2 in the graph of FIG. 6, compensating for the viscosity component of the steering operation mechanism results in a situation where the phase of the actual steered angle $\theta_w$ is advanced such that the phase of the actual steered angle $\theta_w$ is closer to the phase of the target pinion angle $\theta_p^*$ (target steered angle) than the phase of the steered angle $\theta_{wex}$ (comparative example). This is based on the fact that the viscosity component of the steering operation mechanism is exerted in a direction in which the axial force of the steering operation shaft 14 increases with respect to the pinion angle $\theta_p$.

As indicated by the arrow P3 in the graph of FIG. 6, compensating for the inertia component of the steering operation mechanism results in a situation where the amount of change in the actual steered angle $\theta_w$ (or inclination of the actual steered angle $\theta_w$) with respect to time is closer to the amount of change in the target pinion angle $\theta_p^*$ (target steered angle) with respect to time than the amount of change in the steered angle $\theta_{wex}$ (comparative example) with respect to time. This is based on the fact that the inertia component of the steering operation mechanism is exerted so as to further reduce the degree of change in the axial force of the steering operation shaft 14 with respect to an increase in the pinion angle $\theta_p$.

The steered angle $\theta_w$ thus changes such that the steered angle $\theta_w$ is closer to the target pinion angle $\theta_p^*$ (target steered angle) than the steered angle $\theta_w$, (comparative example).

The first embodiment achieves effects described below.

(1) The spring compensation amount $\theta_{pb}$, the viscosity compensation amount $\theta_{pc}$, and the inertia compensation amount $\theta_{pd}$ are added to the target pinion angle $\theta_p^*$ calculated by the steering angle ratio change control circuit 62. This compensates for the spring component, the viscosity component, and the inertia component of the steering operation mechanism of the steering system 10. The spring component results from, for example, the mount rigidity and cornering force of the steering operation mechanism. The viscosity component results from, for example, the viscosity of the steering operation mechanism and the kingpin viscosity. The inertia component results from, for example, the inertia of the steering operation mechanism and the inertia of the steered wheels 16. Such compensation reduces or eliminates steering delay, resulting in an increase in steering responsiveness. Such compensation also causes the steered wheels 16 to be properly steered in accordance with the target pinion angle $\theta_p^*$. When a driving force is provided to the steering operation shaft 14 disposed away from the steering wheel 11, compensating for the inertia component, the viscosity component, and the spring component as described above is effective in causing the steered wheels 16 to be steered properly.

The following description discusses the case in which a differential steering control circuit known in the related art is used instead of the compensation control circuit 63. The differential steering control circuit exercises "differential steering control". The differential steering control involves: multiplying the rate of change in the target pinion angle $\theta_p^*$ (i.e., the differential value of the target pinion angle $\theta_p^*$), calculated by the steering angle ratio change control circuit 62, by a gain so as to calculate a correction angle; and adding the correction angle to the target pinion angle $\theta_p^*$ calculated by the steering angle ratio change control circuit 62. Exercising such differential steering control advances the phase of the target pinion angle $\theta_p^*$. This reduces or eliminates steering delay.

Differential steering control, however, is intended to compensate for the viscosity component of the steering operation mechanism (including the pinion shaft 44 and the steering operation shaft 14). Advancing the phase of the target pinion angle $\theta_p^*$ may thus reduce or eliminate steering delay as indicated by the arrow P2 in the graph of FIG. 6. Differential steering control known in the related art unfortunately fails to provide compensation for the spring component of the steering operation mechanism indicated by the arrow P1 in the graph of FIG. 6 or compensation for the inertia component of the steering operation mechanism indicated by the arrow P3 in the graph of FIG. 6. The spring component and the inertia component may affect steering responsiveness of the steered wheels 16 to an operation performed on the steering wheel 11 or proper steering operation of the steered wheels 16. In this respect, the compensation control circuit 63 compensates for not only the viscosity component of the steering operation mechanism but also the spring component and the inertia component of the steering operation mechanism. The compensation control circuit 63 is thus able to increase the steering responsiveness of the steered wheels 16. The compensation control circuit 63 also causes the steered wheels 16 to be properly steered in accordance with the target pinion angle $\theta_p^*$.

Variations of the first embodiment will be described below. The gains $G_A$, $G_B$, $G_C$ and $G_D$ may be determined as follows. First, the gain $G_A$ may be determined using at least one or more of spring components in a power transmission path between the pinion shaft 44 and the steered wheels 16. This means that the gain $G_A$ may be determined in accordance with two or more spring components. In one example, the gain $G_A$ may be calculated using a mount rigidity $K_G$ of the steering operation mechanism and a rigidity $K_w$ of the steered wheels 16 (or car wheels) as indicated by Equation (B1):

$$G_A = 1/(K_G + K_w) \quad (B1)$$

The gain $G_B$ may be determined without using the trail as indicated by Equation (C1):

$$G_B = 2 \cdot C_{\mathit{ff}} \quad (C1)$$

The gain $G_B$ may be determined without using the cornering force $C_{\mathit{ff}}$ as indicated by Equation (C2):

$$G_B = 2 \cdot \xi \quad (C2)$$

Alternatively, the gain $G_B$ may be determined using a distance $L_f$ between the center of gravity of the vehicle and the center of each steered wheel 16 (i.e., the center of each front wheel tire) in addition to the cornering force $C_{\mathit{ff}}$ and the trail $\xi$ as indicated by Equation (C3):

$$G_B = 2 \cdot C_{\mathit{ff}} \cdot \xi \cdot L_f \quad (C3)$$

The cornering force $C_{\mathit{ff}}$ in each of Equations (C), (C1), and (C3) may be estimated from a tire lateral force detected by a tire force detector (not illustrated). Alternatively, the cornering force $C_{\mathit{ff}}$ in each of Equations (C), (C1), and (C3) may be a constant. The trail in each of Equations (C), (C2), and (C3) may be estimated from a tire lateral force detected by the tire force detector (not illustrated) and a moment around a vertical axis of each steered wheel 16. Alternatively, the trail in each of Equations (C), (C2), and (C3) may be a constant.

The gain $G_C$ is preferably determined using at least one or more of viscosity components in the power transmission path between the pinion shaft 44 and the steered wheels 16. This means that the gain $G_C$ may be determined in accordance with two or more viscosity components. In one example, the gain $G_C$ may be determined by adding up the viscosity $C_w$ of the steering operation mechanism, a car wheel viscosity $C_{ww}$ of the steered wheels 16, and a tire viscosity $C_{wt}$ of the steered wheels 16 as indicated by Equation (D1):

$$G_C = C_w + C_{ww} + C_{wt} \quad (D1)$$

The gain $G_D$ is preferably determined using at least one or more of inertia components in the power transmission path between the pinion shaft 44 and the steered wheels 16. This means that the gain $G_D$ may be determined in accordance with two or more inertia components. In one example, the gain $G_D$ may be determined by adding up the inertia $J_w$ of the steering operation mechanism, a car wheel inertia $J_{ww}$ of the steered wheels 16, and a tire inertia $J_{wt}$ of the steered wheels 16 as indicated by Equation (E1):

$$G_D = J_w + J_{ww} + J_{wt} \quad (E1)$$

The gains $G_B$, $G_C$, and $G_D$ may be changed in accordance with the vehicle speed V detected by the vehicle speed sensor 501 or a load detected by the tire force detector (not illustrated).

Second Embodiment

A steering controller according to a second embodiment of the invention will be described below. The steering controller according to the second embodiment is similar in basic configuration to the steering controller according to the first embodiment illustrated in FIGS. 1 to 5.

Suppose that the steered wheels 16 are steered in a first steered direction and are steered in a second steered direction opposite to the first steered direction. In this case, the sign of a torque exerted on the steering operation shaft 14 so as to cause the steered wheels 16 (or tires) to be steered in the first steered direction is opposite to the sign of a torque exerted on the steering operation shaft 14 so as to cause the steered wheels 16 (or tires) to be steered in the second steered direction. Accordingly, the sign of the spring compensation amount $\theta_{pb}$ calculated by the calculation circuit 102 is preferably inverted in accordance with a steered state (or a steered direction).

As used herein, the "first steered direction" refers to a direction in which the steered wheels 16 are steered when the steering wheel 11 is turned in a first steering direction from a neutral position toward a steering limit. As used herein, the "second steered direction" refers to a direction in which the steered wheels 16 are steered when the steering wheel 11 is turned in a second steering direction opposite to the first steering direction.

In one example, the steered state of the steered wheels 16 can be determined in accordance with a determination value $H_p$ that is the product of a pinion torque $T_p$ and a pinion angular velocity (or steered velocity) $\omega_p$. The determination value $H_p$ is calculated using Equation (F), where $T_p$ denotes a pinion torque obtained in accordance with the current value $I_b$ of the steering motor 41:

$$H_p = T_p \cdot \omega_p \tag{F}$$

When the determination value $H_p$ is positive, the steered wheels 16 are in a first steered state where the steered wheels 16 are steered in the first steered direction. When the determination value $H_p$ is negative, the steered wheels 16 are in a second steered state where the steered wheels 16 are steered in the second steered direction. When the determination value $H_p$ is zero, the steered wheels 16 are in a state where the steered angle $\theta_w$ of the steered wheels 16 is maintained at a constant value. Based on these premises, the compensation control circuit 63 according to the second embodiment is configured as described below.

Figure 7:
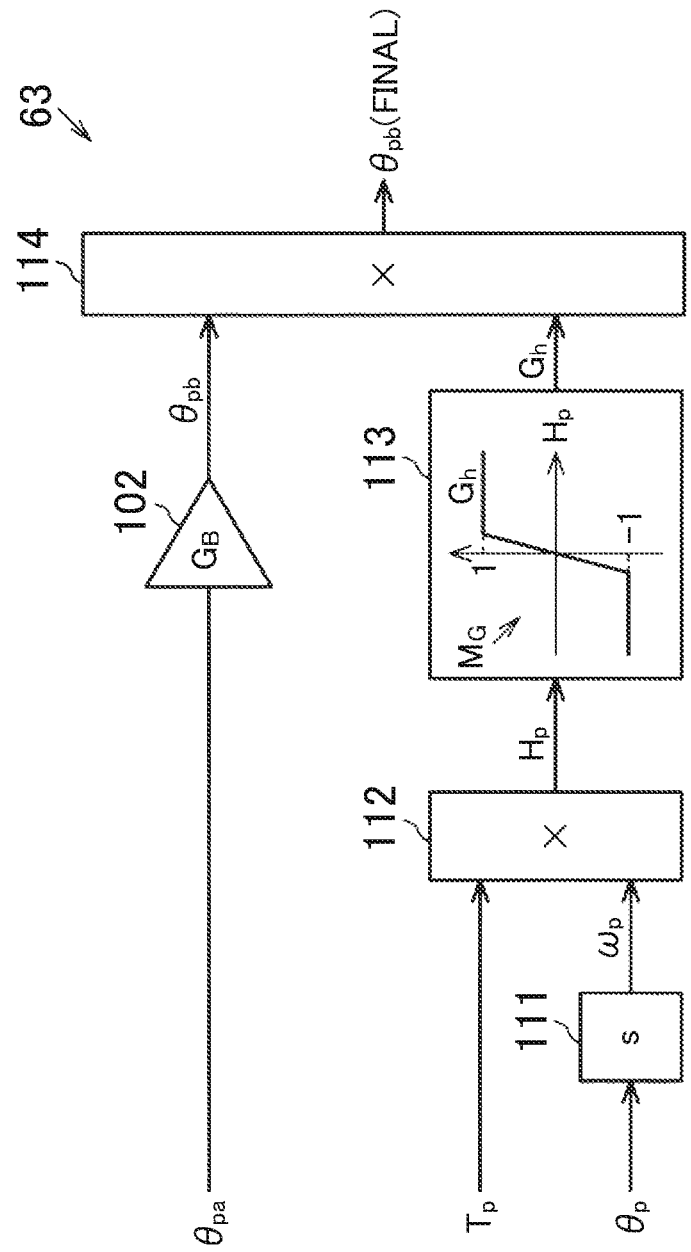
FIG. 7 is a control block diagram illustrating main components of the compensation control circuit according to a second embodiment of the invention.

As illustrated in FIG. 7, the compensation control circuit 63 includes a differentiator 111, a multiplier 112, a gain calculation circuit 113, and a multiplier 114 in addition to the components illustrated in FIG. 5. The differentiator 111 differentiates the pinion angle $\theta_p$ calculated by the pinion angle calculation circuit 61. The differentiator 111 thus calculates the pinion angular velocity $\omega_p$.

The multiplier 112 multiplies the pinion torque $T_p$ by the pinion angular velocity $\omega_p$ so as to calculate the determination value $H_p$ indicative of the steered state. The gain calculation circuit 113 calculates a gain $G_h$ responsive to the determination value $H_p$ using a gain map $M_G$. The gain map $M_G$ defines the relationship between the determination value $H_p$ and the gain $G_h$. The gain map $M_G$ is set such that the positive gain $G_h$ is calculated when the determination value $H_p$ is positive, and the negative gain $G_h$ is calculated when the determination value $H_p$ is negative. The absolute value of the gain $G_h$ is 1.

The multiplier 114 multiplies the spring compensation amount $\theta_{pb}$, calculated by the calculation circuit 102, by the gain $G_h$ so as to calculate the final spring compensation amount $\theta_{pb}$. When the determination value $H_p$ is positive (1), i.e., when the steered wheels 16 are in the first steered state, the final spring compensation amount $\theta_{pb}$ is positive. When the determination value $H_p$ is negative (−1), i.e., when the steered wheels 16 are in the second steered state, the final spring compensation amount $\theta_{pb}$ is negative.

The second embodiment achieves effects described below.

(2) The sign of the spring compensation amount $\theta_{pb}$ calculated by the calculation circuit 102 is inverted in accordance with the determination value $H_p$. This makes it possible to suitably compensate for the spring component of the steering operation mechanism not only when the steered wheels 16 are steered in the first steered direction but also when the steered wheels 16 are steered in the second steered direction.

Variations of the second embodiment will be described below. The determination value $H_p$ may be calculated in accordance with any one of Equations (F1), (F2), and (F3).

$$H_p = T_p \cdot \omega_p \cdot G_1 + dT_p \cdot \theta_p \cdot G_2 \tag{F1}$$

In Equation (F1), $dT_p$ denotes a differential value of the pinion torque $T_p$, $\theta_p$ denotes a pinion angle, $G_1$ denotes a predetermined gain, and $G_2$ denotes another predetermined gain.

$$H_p = T_h \cdot \omega_s \tag{F2}$$

In Equation (F2), $T_h$ denotes a steering torque, and $\omega_s$ denotes a steering speed. The steering speed $\omega_s$ is calculated by differentiating the steering angle $\theta_s$.

$$H_p = T_h \cdot \omega_s \cdot G_1 + dT_p \cdot \theta_s \cdot G_2 \tag{F3}$$

In the second embodiment, the sign of the final spring compensation amount $\theta_{pb}$ is decided by multiplying the spring compensation amount $\theta_{pb}$, calculated by the calculation circuit 102, by the gain $G_h$. Alternatively, the calculation circuit 102 may invert the sign of the gain $G_B$ in accordance with the gain $G_h$.

Third Embodiment

A steering controller according to a third embodiment of the invention will be described below. The steering controller according to the third embodiment is similar in basic configuration to the steering controller according to the first embodiment illustrated in FIGS. 1 to 5.

The third embodiment involves determining the steered state using various pieces of information on the steered side of the steering system 10. The determination value $H_p$ indicative of the steered state can be calculated in accordance with Equation (G1) or (G2).

$$H_p = X_1 \cdot X_2 \tag{G1}$$

In Equation (G1), one of state quantities ($a_1$) to ($a_{13}$) described below or the product of two or more of the state quantities ($a_1$) to ($a_{13}$) is substituted into $X_1$. The differential value of one of the state quantities ($a_1$) to ($a_{13}$) or the product of the differential values of two or more of the state quantities ($a_1$) to ($a_{13}$) is substituted into $X_2$. Any combination of the state quantities ($a_1$) to ($a_{13}$) is effective.

$$H_p = Y_1 + Y_2 \tag{G2}$$

In Equation (G2), the product of one of the state quantities ($a_1$) to ($a_{13}$) and a predetermined gain or the product of values obtained by multiplying each of two or more of the state quantities ($a_1$) to ($a_{13}$) by a predetermined gain is substituted into $Y_1$. The product of the differential value of one of the state quantities ($a_1$) to ($a_{13}$) and a predetermined gain or the product of values obtained by multiplying the differential value of each of two or more of the state quantities ($a_1$) to ($a_{13}$) by a predetermined gain is substituted into $Y_2$. Any combination of the state quantities ($a_1$) to ($a_{13}$) is effective.

The state quantity ($a_1$) is the target pinion angle $\theta_p^*$ (or target steered angle). The state quantity ($a_2$) is the pinion angle $\theta_p$ (or steered angle). The state quantity ($a_3$) is the pinion angle command value $T_p^*$ (or current command value). The state quantity ($a_4$) is the current value $I_b$ of the steering motor 41. The state quantity ($a_5$) is the estimated axial force F2. The state quantity ($a_6$) is the lateral acceleration LA. The state quantity ($a_7$) is the estimated axial force F3. The state quantity ($a_8$) is the yaw rate YR. The state quantity ($a_9$) is the estimated axial force F4. The state quantity ($a_{10}$) is an estimated axial force based on the differential value of the lateral acceleration LA and the differential value of the yaw rate YR. The state quantity ($a_{11}$) is the ideal axial force F1. The state quantity ($a_{12}$) is a lateral force of the steered wheels 16. The state quantity ($a_{13}$) is a self-aligning torque of the steered wheels 16. The self-aligning torque may be a detection value or estimated value. The controller 50 of the steering system 10 exercises reaction control and steering control in accordance with the steering state. Accordingly, the controller 50 is required to exercise reaction control and steering control in consideration of the steered state depending on product specifications, for example.

The third embodiment thus involves using the determination value $H_p$ responsive to the steered state (i.e., the first steered state or the second steered state) so as to calculate control parameter(s) to be used when the controller 50 exercises reaction control and steering control.

The following description discusses how the steered state is reflected in the target steering reaction $T_1^*$ that is a control parameter calculated by the target steering reaction calculation circuit 51. The determination value $H_p$ in this case is calculated using the current value $I_b$ of the steering motor 41 and the differential value of the pinion angle $\theta_p$ in Equation (G1). The differential value of the pinion angle $\theta_p$ corresponds to the pinion angular velocity $\omega_p$. The current value $I_b$ of the steering motor 41 is the state quantity ($a_4$). The pinion angle $\theta_p$ is the state quantity ($a_2$).

Figure 9:
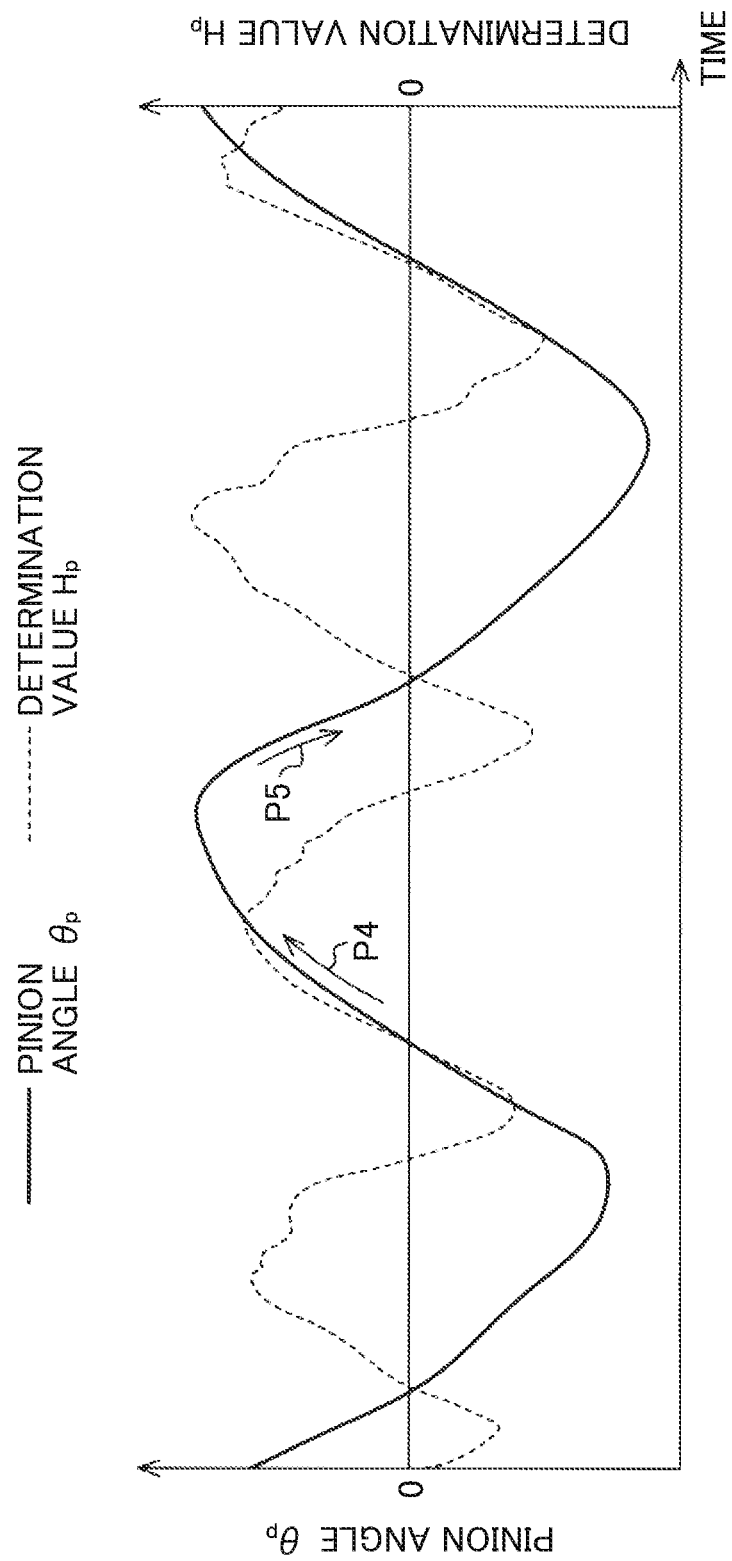
FIG. 9 is a graph illustrating changes in pinion angle and steered state determination value with respect to time in the third embodiment.

The graph of FIG. 9 illustrates exemplary changes in the pinion angle $\theta_p$ and the determination value $H_p$ with respect to time. As indicated by the arrow P4 in the graph of FIG. 9, the determination value $H_p$ is positive when the steered wheels 16 are in the first steered state, i.e., when the absolute value of the pinion angle $\theta_p$ increases relative to zero degrees corresponding to a neutral steered position. As indicated by the arrow P5 in the graph of FIG. 9, the determination value $H_p$ is negative when the steered wheels 16 are in the second steered state, i.e., when the absolute value of the pinion angle $\theta_p$ approaches zero degrees. The determination value $H_p$ is zero when the pinion angle $\theta_p$ has reached zero degrees (i.e., when the steered wheels 16 are located at the neutral steered position) or when the pinion angle $\theta_p$ is an angle at which the vehicle travels forward.

Figure 8:
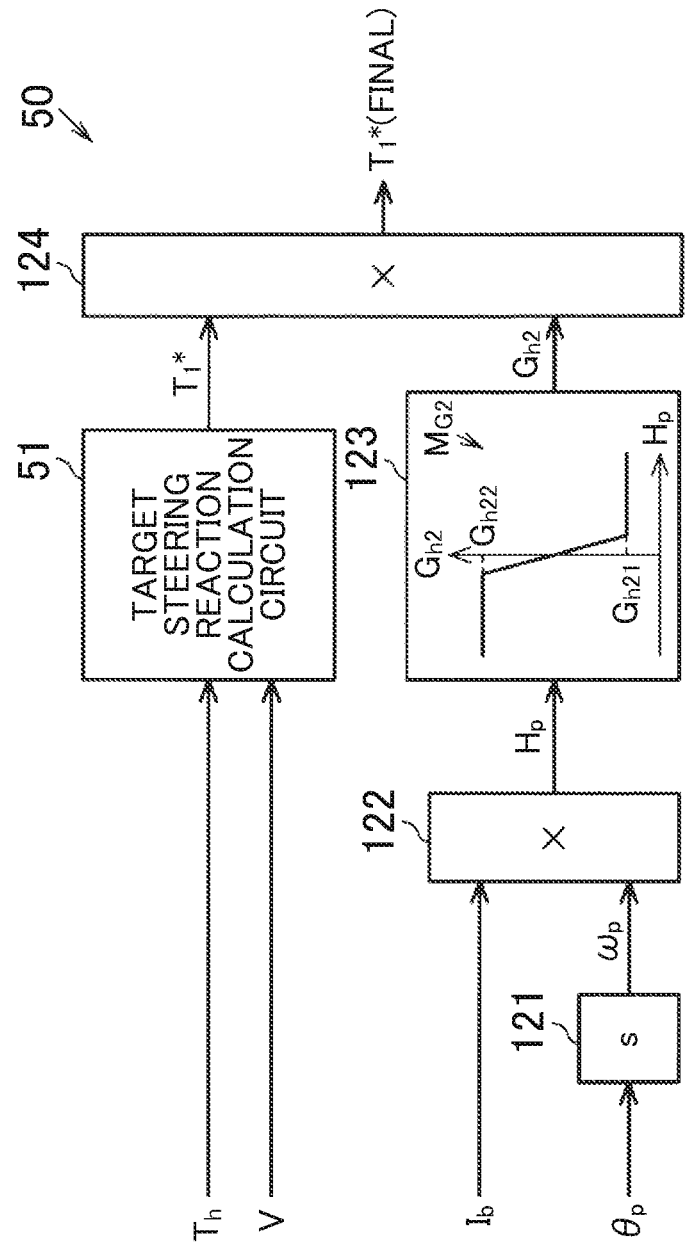
FIG. 8 is a control block diagram illustrating main components of the controller according to a third embodiment of the invention.

The configuration of the controller 50 will be described below. As illustrated in FIG. 8, the controller 50 (or more specifically, the reaction control circuit 50a) includes a differentiator 121, a multiplier 122, a gain calculation circuit 123, and a multiplier 124.

The differentiator 121 differentiates the pinion angle $\theta_p$ calculated by the pinion angle calculation circuit 61. The differentiator 121 thus calculates the pinion angular velocity $\omega_p$. The multiplier 122 multiplies the current value $I_b$ of the steering motor 41 by the pinion angular velocity $\omega_p$ so as to calculate the determination value $H_p$ indicative of the steered state (or steered direction).

The gain calculation circuit 123 calculates a gain $G_{h2}$ responsive to the determination value $H_p$ using a gain map $M_{G2}$. The gain map $M_{G2}$ defines the relationship between the determination value $H_p$ and the gain $G_{h2}$. The gain map $M_{G2}$ is set such that a gain $G_{h21}$ is calculated when the determination value $H_p$ is positive and a gain $G_{h22}$ is calculated when the determination value $H_p$ is negative. Each of the gains $G_{h21}$ and $G_{h22}$ is a positive value. The gain $G_{h21}$ is smaller than the gain $G_{h22}$.

The multiplier 124 multiplies the target steering reaction $T_1^*$, calculated by the target steering reaction calculation circuit 51, by the gain $G_{h2}$ so as to calculate the final target steering reaction $T_1^*$. Using the final target steering reaction $T_1^*$ calculated by the multiplier 124 enables the controller 50 to exercise suitable reaction control and steering control in accordance with the steered state.

The third embodiment achieves effects described below.

(3) The controller 50 estimates the steered state (i.e., whether the steered wheels 16 are in the first steered state or the second steered state) and multiplies the control parameter (i.e., the target steering reaction $T_1^*$ in the third embodiment) by the gain $G_{h2}$ responsive to the steered state estimated. Using the control parameter responsive to the steered state enables the controller 50 to exercise suitable steering control responsive to the steered state and suitable reaction control responsive to the steered state. Unlike when the same control parameter is used irrespective of the steered state so as to exercise steering control and reaction control, the third embodiment enhances control performance for both of steering control and reaction control.

An element to calculate the determination value $H_p$ (i.e., an element equivalent to the multiplier 122) and an element to calculate the gain $G_{h2}$ (i.e., an element equivalent to the gain calculation circuit 123) are preferably provided in association with at least one of the calculation circuits and control circuits of the controller 50 in accordance with product specifications, for example. This means that the element to calculate the determination value $H_p$ and the element to calculate the gain $G_{h2}$ may be provided in one of the calculation circuits and control circuits of the controller 50 other than the target steering reaction calculation circuit 51, or may be provided in association with all of the calculation circuits and control circuits of the controller 50 or two or more, but not all, of the calculation circuits and control circuits of the controller 50. In the example illustrated in FIG. 2, the number of calculation circuits and control circuits of the controller 50 is 10 in total.

Fourth Embodiment

A vehicle controller according to a fourth embodiment of the invention is included in an electric power steering system 150 (hereinafter referred to as an "EPS 150"). The EPS 150 including the vehicle controller according to the fourth embodiment will be described below. Components similar to those of the first embodiment are identified by the same reference signs, and detailed description thereof will be omitted.

Figure 10:
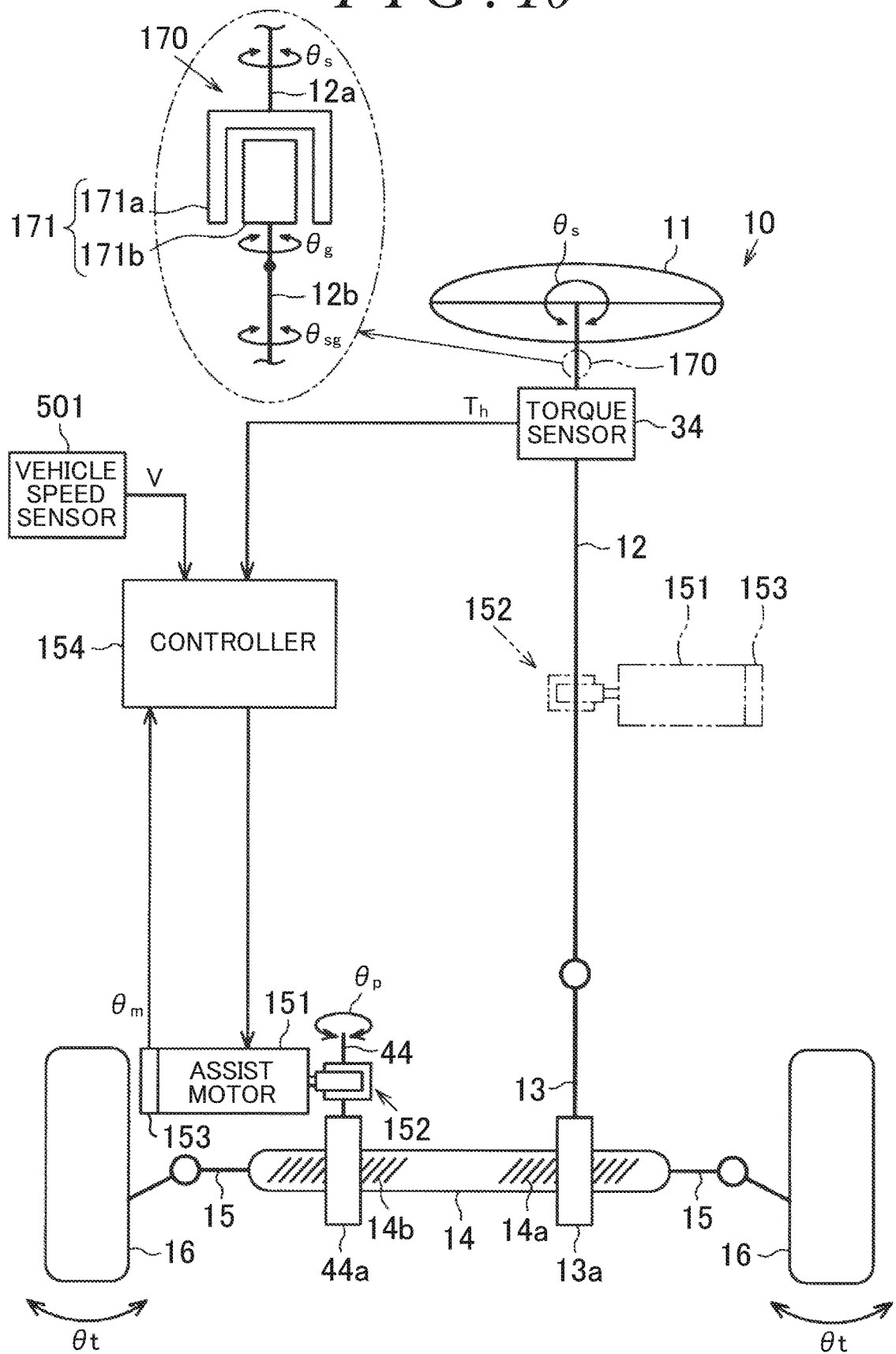
FIG. 10 is a schematic diagram illustrating an electric power steering system equipped with a steering controller according to a fourth embodiment of the invention.

As illustrated in FIG. 10, the EPS 150 includes the steering shaft 12, the pinion shaft 13, and the steering operation shaft 14 that function as a power transmission path between the steering wheel 11 and the steered wheels 16. A reciprocating rectilinear motion of the steering operation shaft 14 is transmitted to the right and left steered wheels 16 through the tie rods 15 each coupled to an associated one of the ends of the steering operation shaft 14.

The EPS 150 includes an assist motor 151, a speed reducer 152, the torque sensor 34, a rotation angle sensor 153, and a controller 154 that function as a steering assist force generator to generate a steering assist force (which may also be referred to as an "assist force"). The rotation angle sensor 153 is disposed on the assist motor 151. The rotation angle sensor 153 detects a rotation angle $\theta_m$ of the assist motor 151.

The assist motor 151 is a source of the steering assist force. Examples of the assist motor 151 to be used include a three-phase brushless motor. The assist motor 151 is coupled to the pinion shaft 44 through the speed reducer 152. The speed reducer 152 reduces the speed of rotation of the assist motor 151. The resulting rotational force is transmitted from the pinion shaft 44 to the pinion shaft 13 through the steering operation shaft 14. This rotational force is transmitted in the form of the steering assist force.

The controller 154 exercises assist control to produce a steering assist force responsive to the steering torque $T_h$ by performing energization control for the assist motor 151. The controller 154 controls supply of power to the assist motor 151 in accordance with the steering torque $T_h$ detected by the torque sensor 34, the vehicle speed V detected by the vehicle speed sensor 501, and the rotation angle $\theta_m$ detected by the rotation angle sensor 153.

Figure 11:
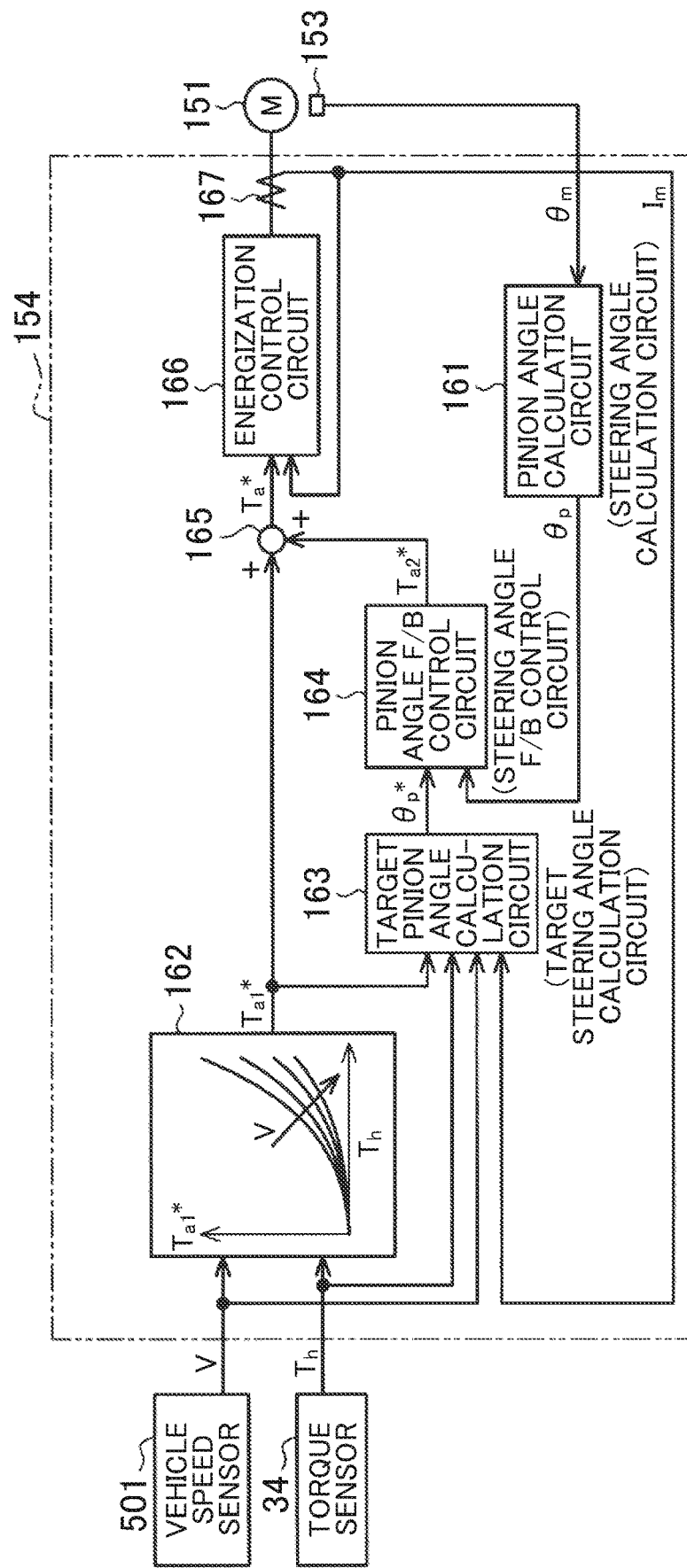
FIG. 11 is a control block diagram of the steering controller according to the fourth embodiment.

As illustrated in FIG. 11, the controller 154 includes a pinion angle calculation circuit 161, a basic assist component calculation circuit 162, a target pinion angle calculation circuit 163, a pinion angle feedback control circuit (or pinion angle F/B control circuit) 164, an adder 165, and an energization control circuit 166.

The pinion angle calculation circuit 161 receives the rotation angle $\theta_m$ of the assist motor 151. In accordance with the rotation angle $\theta_m$ received, the pinion angle calculation circuit 161 calculates the pinion angle $\theta_p$ that is a rotation angle of the pinion shaft 44.

The basic assist component calculation circuit 162 calculates a basic assist component $T_{a1}*$ in accordance with the steering torque $T_h$ and the vehicle speed V. The basic assist component calculation circuit 162 calculates the basic assist component $T_{a1}*$ using a three-dimensional map that defines the relationship between the steering torque $T_h$ and the basic assist component $T_{a1}*$ in accordance with the vehicle speed V. The greater the absolute value of the steering torque $T_h$, the greater the absolute value of the basic assist component $T_{a1}*$ calculated by the basic assist component calculation circuit 162. The lower the vehicle speed V, the greater the absolute value of the basic assist component $T_{a1}*$ calculated by the basic assist component calculation circuit 162.

The target pinion angle calculation circuit 163 receives the basic assist component $T_{a1}*$ calculated by the basic assist component calculation circuit 162 and the steering torque $T_h$. Assuming that the sum of the basic assist component $T_{a1}*$ and the steering torque $T_h$ is an input torque, the target pinion angle calculation circuit 163 includes an ideal model that defines an ideal pinion angle in accordance with the input torque. Providing the ideal model involves conducting, for example, experiment(s) in advance so as to model a pinion angle responsive to an ideal steered angle determined in accordance with the input torque. The target pinion angle calculation circuit 163 adds up the basic assist component $T_{a1}*$ and the steering torque $T_h$ so as to determine the input torque. The target pinion angle calculation circuit 163 calculates, from the input torque determined, the target pinion angle $\theta_p*$ in accordance with the ideal model. In calculating the target pinion angle $\theta_p*$, the target pinion angle calculation circuit 163 factors in the vehicle speed V and a current value $I_m$ detected by a current sensor 167. The current sensor 167 is disposed on a power supply path connected to the assist motor 151. The current value $I_m$ is the value of an actual current supplied to the assist motor 151.

The pinion angle feedback control circuit 164 receives the target pinion angle $\theta_p*$ calculated by the target pinion angle calculation circuit 163 and the actual pinion angle $\theta_p$ calculated by the pinion angle calculation circuit 161. The pinion angle feedback control circuit 164 performs proportional-integral-differential (PID) control in the form of pinion angle feedback control such that the actual pinion angle $\theta_p$ approaches or corresponds to the target pinion angle $\theta_p*$. The pinion angle feedback control circuit 164 determines a difference between the target pinion angle $\theta_p*$ and the actual pinion angle $\theta_p$. The pinion angle feedback control circuit 164 calculates a correction component $T_{a2}*$ to be added to the basic assist component $T_{a1}*$ so as to eliminate the difference.

The adder 165 adds the correction component $T_{a2}*$ to the basic assist component $T_{a1}*$ so as to calculate an assist command value $T_a*$. The assist command value $T_a*$ is indicative of a rotational force (or assist torque) to be produced by the assist motor 151.

The energization control circuit 166 supplies power to the assist motor 151. The power is responsive to the assist command value $T_a*$. Specifically, the energization control circuit 166 calculates a current command value for the assist motor 151 in accordance with the assist command value $T_a*$.

The energization control circuit 166 receives the current value $I_m$ detected by the current sensor 167. The energization control circuit 166 determines a difference between the current command value and the actual current value $I_m$. The energization control circuit 166 controls supply of power to the assist motor 151 so as to eliminate the difference. The assist motor 151 thus produces a torque responsive to the assist command value $T_a*$. This consequently provides a steering assist responsive to the steering state.

In accordance with the ideal model, the controller 154 of the EPS 150 calculates the target pinion angle $\theta_p*$ from the input torque (i.e., the sum of the basic assist component $T_{a1}*$ and the steering torque $T_h$) and performs feedback control such that the actual pinion angle $\theta_p$ corresponds to the target pinion angle $\theta_p*$. As previously described, the pinion angle $\theta_p$ has a correlation with a steered angle $\theta t$ of the steered wheels 16. The steering of the steered wheels 16 responsive to the input torque is thus determined in accordance with the ideal model. This means that a vehicle steering response is determined in accordance with the ideal model. Consequently, adjusting the ideal model makes it possible to provide a desired steering response.

The EPS 150 maintains the actual steered angle $\theta t$ at the steered angle $\theta t$ responsive to the target pinion angle $\theta_p*$. This achieves the effect of reducing or eliminating reverse input vibrations resulting from a disturbance, such as a road surface condition or braking. Specifically, the correction component $T_{a2}*$ would be adjusted such that the pinion angle $\theta_p$ corresponds to the target pinion angle $\theta_p*$, if vibrations are transmitted to components of the steering operation mechanism, such as the steering shaft 12, through the steered wheels 16. The actual steered angle $\theta t$ is thus maintained at the steered angle $\theta t$ responsive to the target pinion angle $\theta_p*$ defined by the ideal model. This consequently provides a steering assist in a direction in which reverse input vibrations are cancelled, preventing the reverse input vibrations from being transmitted to the steering wheel 11.

A steering reaction (i.e., a resistance felt by the driver through the steering wheel 11) is a force (or torque) exerted in a direction opposite to a direction in which the steering wheel 11 is turned by the driver. The steering reaction, however, is merely responsive to the target pinion angle $\theta_p*$. In other words, the steering reaction does not change in accordance with a road surface condition, such as a dry road or a low friction road. This makes it difficult for the driver to understand a road surface condition by feeling a resistance while he or she is turning the steering wheel 11.

To solve this problem, the target pinion angle calculation circuit 163 according to the fourth embodiment has the calculation function of the target steering angle calculation circuit 52 according to the first embodiment. The target pinion angle calculation circuit 163 is similar in functional configuration to the target steering angle calculation circuit 52 illustrated in FIG. 3. The target steering angle calculation circuit 52 according to the first embodiment receives the target steering reaction $T_1*$, but the target pinion angle calculation circuit 163 according to the fourth embodiment receives the basic assist component $T_{a1}*$. The target steering angle calculation circuit 52 according to the first embodiment receives the current value $I_b$ of a current supplied to the steering motor 41, but the target pinion angle calculation circuit 163 according to the fourth embodiment receives the current value $I_m$ of a current supplied to the assist motor 151. Similarly to the target steering angle calculation circuit 52 according to the first embodiment, the target pinion angle calculation circuit 163 receives the steering torque $T_h$ and the vehicle speed V. The target steering angle calculation circuit 52 according to the first embodiment calculates the target steering angle θ*, but the target pinion angle calculation circuit 163 according to the fourth embodiment calculates the target pinion angle $θ_p$*. Although some of signals to be received by the target pinion angle calculation circuit 163 and a signal to be produced by the target pinion angle calculation circuit 163 differ from some of signals to be received by the target steering angle calculation circuit 52 and a signal to be produced by the target steering angle calculation circuit 52, the target pinion angle calculation circuit 163 performs an internal calculation process in the same manner as the target steering angle calculation circuit 52 according to the first embodiment.

As indicated by the associated long dashed double-short dashed lines in FIG. 10, the EPS 150 may be provided with a variable-gear-ratio (VGR) mechanism 170. In this case, a VGR motor 171 is disposed on a portion of the steering shaft 12 located between the steering wheel 11 and the torque sensor 34. With the aim of improving steering operability, the VGR mechanism 170 changes the ratio between the steering angle $θ_s$ and the steered angle θt (which is a gear ratio) using the VGR motor 171. The VGR motor 171 includes a stator 171a and a rotor 171b. The steering shaft 12 includes an input shaft 12a and an output shaft 12b. The input shaft 12a is a portion of the steering shaft 12 adjacent to the steering wheel 11. The output shaft 12b is a portion of the steering shaft 12 adjacent to the pinion shaft 13. The stator 171a of the VGR motor 171 is coupled to the input shaft 12a. The rotor 171b of the VGR motor 171 is coupled to the output shaft 12b.

When the steering wheel 11 is rotated, the stator 171a of the VGR motor 171 rotates by the same angle as the steering wheel 11. The controller 154 rotates the rotor 171b of the VGR motor 171 in response to the rotation of the steering wheel 11 and the vehicle speed V. A rotation angle $θ_{sg}$ of the output shaft 12b relative to the input shaft 12a is thus represented by Equation (H):

$$θ_{sg} = θ_s + θ_g \qquad (H)$$

In Equation (H), $θ_s$ denotes a steering angle, and $θ_g$ denotes a rotation angle of the VGR motor 171. Accordingly, controlling the rotation angle $θ_g$ of the VGR motor 171 provides any desired gear ratio.

As indicated by the name within the parentheses under the target pinion angle calculation circuit 163 in FIG. 11, the target pinion angle calculation circuit 163 functions as a target steering angle calculation circuit to calculate the sum of the steering angle $θ_s$ and the rotation angle $θ_g$ of the VGR motor 171 (i.e., a target value for the rotation angle $θ_{sg}$ of the output shaft 12b relative to the input shaft 12a). In calculating the target value for the rotation angle $θ_{sg}$, the target pinion angle calculation circuit 163 functioning as the target steering angle calculation circuit uses the sum of the steering speed $ω_s$ and the rotation speed of the VGR motor 171. The pinion angle feedback control circuit 164 functions as a steering angle feedback control circuit to determine a difference between the target value for the rotation angle $θ_{sg}$ and the actual rotation angle $θ_{sg}$ and calculate the correction component $T_{a2}$* to be added to the basic assist component $T_{a1}$* so as to eliminate the difference.

The controller 154 of the EPS 150 including the VGR mechanism 170 is provided with a steering angle ratio change control circuit and a differential steering control circuit. The steering angle ratio change control circuit and the differential steering control circuit serve to control the VGR motor 171. The steering angle ratio change control circuit calculates a target rotation angle of the VGR motor 171 in accordance with the steering angle $θ_s$ and the vehicle speed V, for example. The differential steering control circuit corrects the target rotation angle of the VGR motor 171 in accordance with the steering speed $ω_s$ and the vehicle speed V so as to calculate the final target rotation angle. The controller 154 controls supply of power to the VGR motor 171 by performing feedback control such that the actual rotation angle of the VGR motor 171 corresponds to the target rotation angle.

Alternatively, the controller 154 may be provided with no differential steering control circuit to control the VGR motor 171. In this case, the controller 154 may have a calculation function similar to the calculation function of the compensation control circuit 63 illustrated in FIG. 5 or FIG. 7. Irrespective of whether the EPS 150 includes the VGR mechanism 170, the controller 154 of the EPS 150 may have calculation functions similar to the calculation functions of the controller 50 illustrated in FIG. 8 (e.g., the calculation functions of the multiplier 122 to calculate the determination value $H_p$ indicative of the steered state and the gain calculation circuit 123 to calculate the gain $G_{h2}$). The controller 154 of the EPS 150 thus achieves effects similar to those of the first to third embodiments described above.

The fourth embodiment may be modified as described below.

The fourth embodiment has been described on the assumption that the EPS 150 provides a steering assist force to the steering operation shaft 14. Alternatively, the EPS 150 may be configured to provide a steering assist force to the steering shaft 12. The following description discusses a variation of the fourth embodiment involving providing a steering assist force to the steering shaft 12.

In this variation, the assist motor 151 is coupled not to the steering operation shaft 14 but to the steering shaft 12 through the speed reducer 152 as indicated by the associated long dashed double-short dashed lines in FIG. 10. The EPS 150 may include no pinion shaft 44. In such a case, the controller 154 exercises feedback control for the steering angle $θ_s$ instead of feedback control for the pinion angle $θ_p$.

As indicated by the name within the parentheses under the pinion angle calculation circuit 161 in FIG. 11, the pinion angle calculation circuit 161 functions as a steering angle calculation circuit to calculate the steering angle $θ_s$ in accordance with the current value $I_m$ of the assist motor 151. The target pinion angle calculation circuit 163 functions as a target steering angle calculation circuit to calculate a target steering angle (i.e., a target value for the steering angle $θ_s$) in accordance with the steering torque $T_h$, the vehicle speed V, the basic assist component $T_{a1}$*, and the current value $I_m$. The target steering angle calculation circuit is similar in basic configuration to the target steering angle calculation circuit 52 illustrated in FIG. 3. The controller 154 is provided with a differentiator 79. The differentiator 79 differentiates the steering angle $θ_s$ so as to calculate the steering speed $ω_s$. The pinion angle feedback control circuit 164 functions as a steering angle feedback control circuit to determine a difference between the target steering angle and the actual steering angle $θ_s$ and calculate the correction component $T_{a2}$* to be added to the basic assist component $T_{a1}$* so as to eliminate the difference.

Each of the foregoing embodiments may be modified as described below.

The target steering reaction calculation circuit 51 according to each of the first to third embodiments determines the target steering reaction $T_1$* in accordance with the steering torque $T_h$ and the vehicle speed V. Alternatively, the target steering reaction calculation circuit 51 may determine the target steering reaction $T_1^*$ in accordance with only the steering torque $T_h$. The basic assist component calculation circuit 162 according to the fourth embodiment determines the basic assist component $T_{a1}^*$ in accordance with the steering torque $T_h$ and the vehicle speed V. Alternatively, the basic assist component calculation circuit 162 may determine the basic assist component $T_{a1}^*$ in accordance with only the steering torque $T_h$.

In each of the first to fourth embodiments, the vehicle model 72 (see FIG. 4) preferably includes at least one of the three estimated axial force calculation circuits (i.e., the estimated axial force calculation circuits 92, 93, and 94). In this case, the estimated axial force calculated by any one of the estimated axial force calculation circuits 92, 93, and 94 is reflected in the input torque $T_{in}^*$, making it possible to provide a steering reaction reflective of a vehicle behavior or a road surface condition.

In each of the first to third embodiments, the steering system 10 may be provided with a clutch 21. In this case, as indicated by the long dashed double-short dashed lines in FIG. 1, the steering shaft 12 and the pinion shaft 13 are coupled to each other through the clutch 21. The clutch 21 to be used is an electromagnetic clutch that transmits or cuts off power in response to energization or non-energization of an exciting coil. The controller 50 exercises clutch engaging and disengaging control to perform switching between engagement and disengagement of the clutch 21. Disengaging the clutch 21 mechanically disconnects the steering wheel 11 from the steered wheels 16. Engaging the clutch 21 mechanically connects the steering wheel 11 to the steered wheels 16.

Each of the first to third embodiments involves compensating for all of the spring component, the viscosity component, and inertia component of the steering operation mechanism. An alternative embodiment may involve compensating for at least one of the spring component, the viscosity component, and inertia component in accordance with product specifications, for example. One example preferably involves compensating for only the inertia component when the inertia component significantly affects the steering of the steered wheels 16 but the influence of the viscosity component and spring component is negligible. Another example preferably involves compensating for only the inertia component and the spring component when the inertia component and the spring component significantly affect the steering of the steered wheels 16 but the influence of the viscosity component is negligible. Selectively compensating for the inertia component, the viscosity component, and the spring component in accordance with the characteristics of the steering operation mechanism in this manner makes it possible to suitably reduce or eliminate any one, two, or all of the inertia component, the viscosity component, and the spring component that affect(s) the steering of the steered wheels 16. This consequently makes it possible to flexibly compensate for any one, two, or all of the inertia component, the viscosity component, and the spring component in accordance with the characteristics of various steering operation mechanisms.

What is claimed is:

1. A steering controller to control a motor in accordance with a command value calculated in response to a steering state, the motor being a source of a driving force to be provided to a steering operation mechanism configured to steer a steered wheel of a vehicle, the steering controller comprising:

a compensation control circuit to calculate a compensation amount in response to the steering state so as to compensate for at least one of: (a) an inertia component, (b) a viscosity component, or (c) a spring component, of the steering operation mechanism in accordance with a target rotation angle of a rotator, the compensation amount being reflected in the command value, the rotator being configured to rotate in conjunction with steering of the steered wheel and the rotator being connected to a steering operation shaft;

a first calculation circuit to calculate the target rotation angle of the rotator in accordance with the steering state; and a second calculation circuit to calculate the command value by performing feedback control such that an actual rotation angle of the rotator corresponds to the target rotation angle, wherein the compensation control circuit includes:
  a compensation amount calculation circuit to calculate the compensation amount in accordance with the target rotation angle calculated by the first calculation circuit, and
  an adder to add the compensation amount to the target rotation angle so as to calculate a final target rotation angle to be used for the calculation of the command value, the compensation amount being calculated by the compensation amount calculation circuit, the target rotation angle being calculated by the first calculation circuit.

2. The steering controller according to claim 1, wherein the motor is a steering motor to provide a driving force to the steering operation shaft, the steering operation shaft being a component of the steering operation mechanism.

3. A steering controller to control a motor in accordance with a command value calculated in response to a steering state, the motor being a source of a driving force to be provided to a steering operation mechanism configured to steer a steered wheel of a vehicle, the steering controller comprising:

a compensation control circuit to calculate a compensation amount in response to the steering state so as to compensate for at least one of: (a) an inertia component, (b) a viscosity component, or (c) a spring component, of the steering operation mechanism in accordance with a target rotation angle of a rotator, the compensation amount being reflected in the command value, the rotator being configured to rotate in conjunction with steering of the steered wheel and the rotator being connected to a steering operation shaft, wherein:

the steering controller calculates a gain in accordance with whether the steered wheel is in a first steered state where the steered wheel is steered in a first steered direction or in a second steered state where the steered wheel is steered in a second steered direction, the first steered direction being a direction in which the steered wheel is steered when the steering wheel is turned in a first steering direction from a neutral position toward a steering limit, the second steered direction being a direction in which the steered wheel is steered when the steering wheel is turned in a second steering direction opposite to the first steering direction, and the steering controller multiplies the compensation amount by the gain, the compensation amount being calculated by the compensation control circuit.

4. The steering controller according to claim 3, wherein the motor is a steering motor to provide a driving force to the steering operation shaft, the steering operation shaft being a component of the steering operation mechanism.

5. A steering controller to control a motor in accordance with a command value calculated in response to a steering state, the motor being a source of a driving force to be provided to a steering operation mechanism configured to steer a steered wheel of a vehicle, the steering controller comprising:

a compensation control circuit to calculate a compensation amount in response to the steering state so as to compensate for at least one of: (a) an inertia component, (b) a viscosity component, or (c) a spring component, of the steering operation mechanism in accordance with a target rotation angle of a rotator, the compensation amount being reflected in the command value, the rotator being configured to rotate in conjunction with steering of the steered wheel and the rotator being connected to a steering operation shaft, wherein:

the steering controller calculates a gain in accordance with whether the steered wheel is in a first steered state where the steered wheel is steered in a first steered direction or in a second steered state where the steered wheel is steered in a second steered direction, the first steered direction being a direction in which the steered wheel is steered when the steering wheel is turned in a first steering direction from a neutral position toward a steering limit, the second steered direction being a direction in which the steered wheel is steered when the steering wheel is turned in a second steering direction opposite to the first steering direction, and the steering controller multiplies a control parameter by the gain, the control parameter being used in course of the calculation of the command value.

6. The steering controller according to claim 5, wherein the motor is a steering motor to provide a driving force to the steering operation shaft, the steering operation shaft being a component of the steering operation mechanism.

* * * * *